United States Patent

[11] 3,586,950

[72] Inventor  Jacques Prodel
             13 rue Michelet, Rueil-Malmaison, Hauts-
             de-Seine 92, France
[21] Appl. No. 793,092
[22] Filed    Jan. 22, 1969
[45] Patented June 22, 1971
[32] Priority Jan. 23, 1968
[33]          France
[31]          136,960

[54] INSTALLATION FOR PROGRAMMED CONTROL
     OF A MACHINE-TOOL
     20 Claims, 30 Drawing Figs.
[52] U.S. Cl. ................................................. 318/594,
                                             318/603, 318/640
[51] Int. Cl. ........................................... G05b 11/18,
                                                    G05b 1/06
[50] Field of Search ........................................ 318/20.100,
                                                      560—696

[56]              References Cited
           UNITED STATES PATENTS
2,694,804  11/1954  Wagner ........................ 318/18 UX
3,178,716  4/1965   Slatin .......................... 318/162 X
3,202,895  8/1965   Arp et al. ..................... 318/28 X
3,394,293  7/1968   Taniguchi et al. ............. 316/162 X
3,467,900  9/1969   Benton ......................... 318/18

Primary Examiner—Benjamin Dobeck
Attorney—Jacobi, Davidson, Lilling and Siegel

ABSTRACT: Installation for programmed control of a machine tool of the type comprising, for each carriage, a mechanism for controlling the drive linked to a motor and a system for controlling the supply to said motor, said installation including: means for the detection of approach having a relatively average accuracy of the order of 0.3 mm., by default, said approach detection means being capable of covering on their own the total extent of travel of the carriage; and means for the detection of stopping having a relatively high accuracy of the order of 0.02 mm.; and wherein said system for controlling the supply to said motor is connected through appropriate connecting means to selectively be commanded by said approach detection means, the information supplied by said approach detection means causing the supply of current to said motor to change so as to slow down said motor to a constant minimum speed and at the same time conditioning said connecting means so that said supply control system is put under the control of said stop detection means, the information supplied by said stop detection means subsequently causing cutting off of said supply to the motor in order to ensure the precise stopping of said carriage.

INVENTOR: JACQUES PRODEL

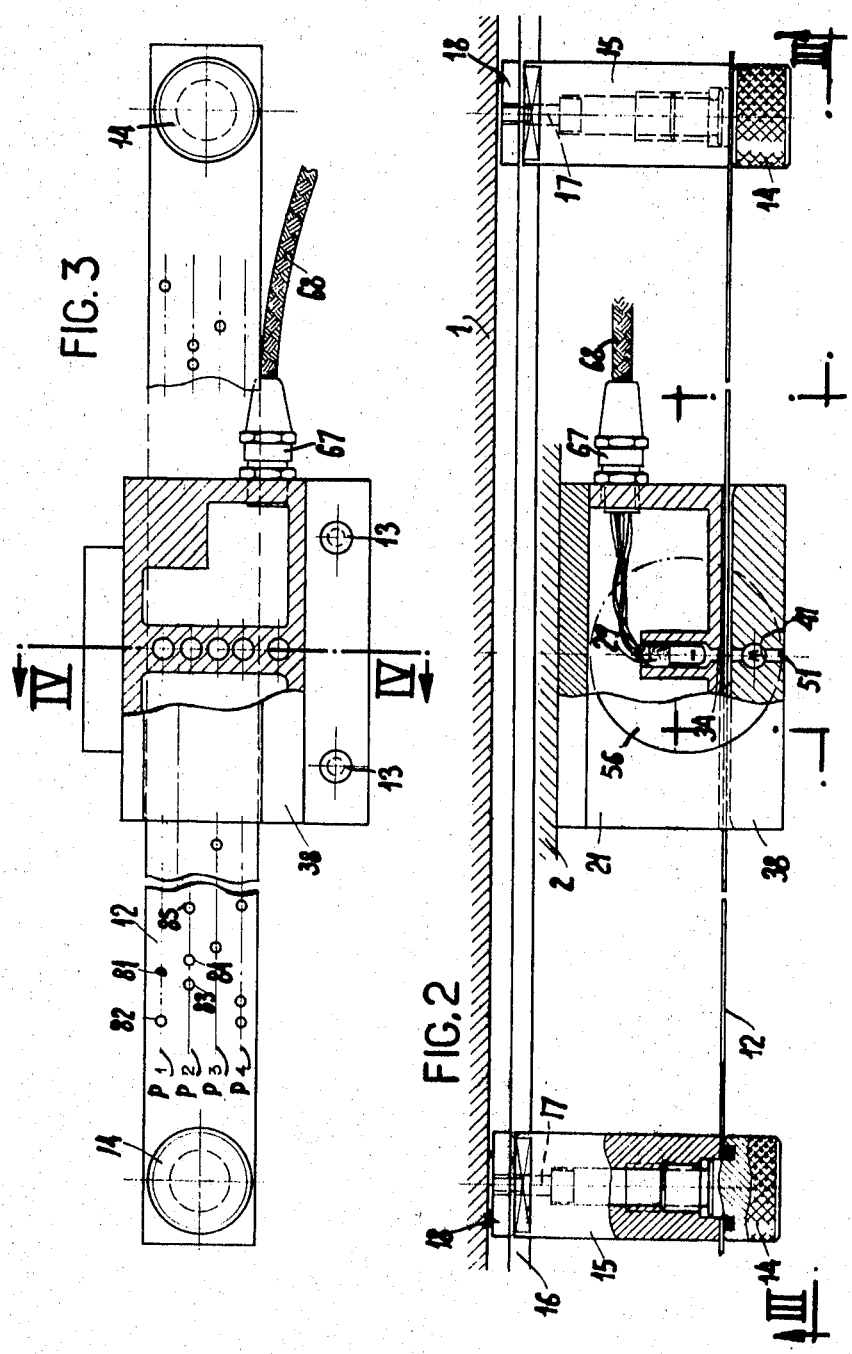

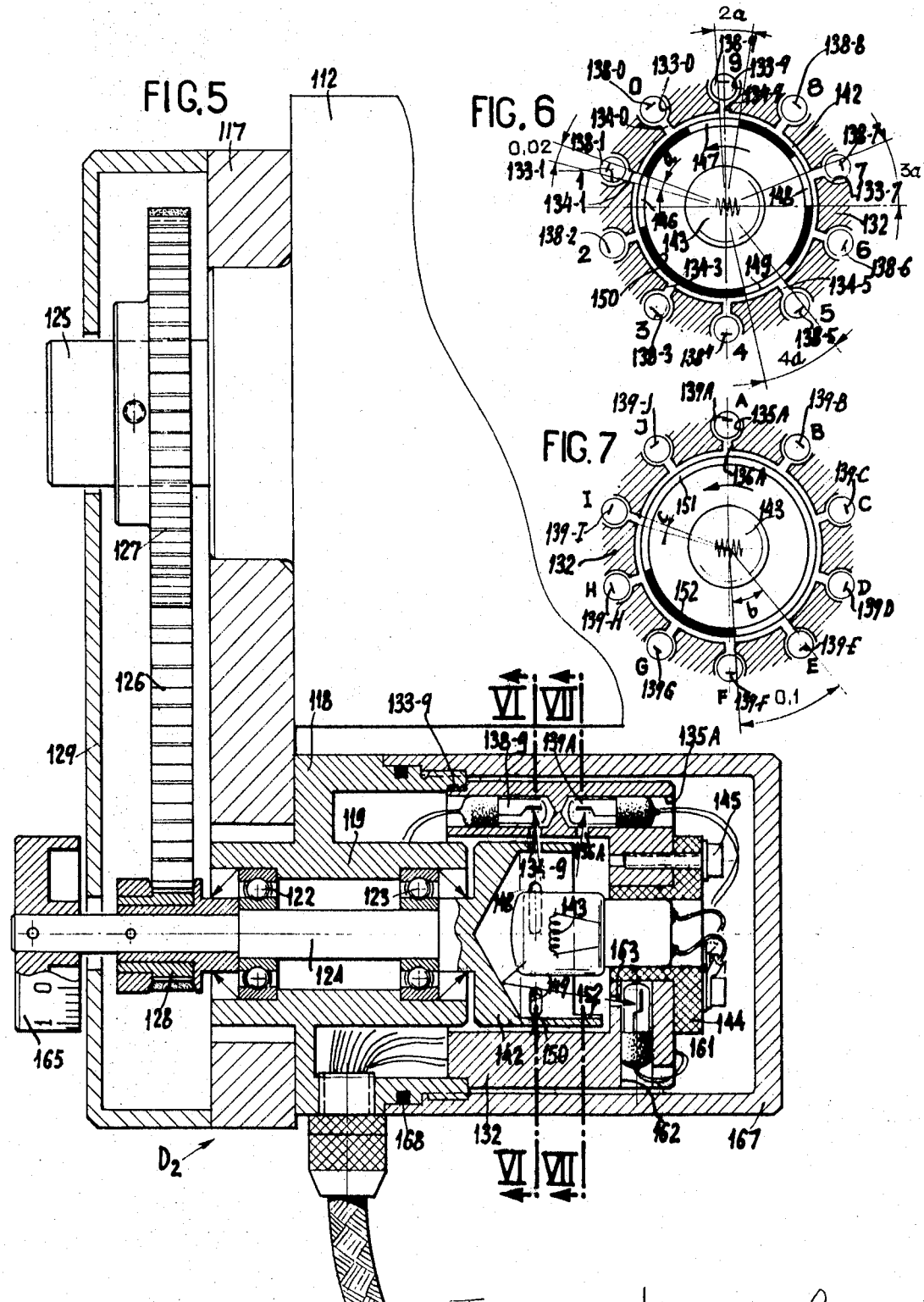

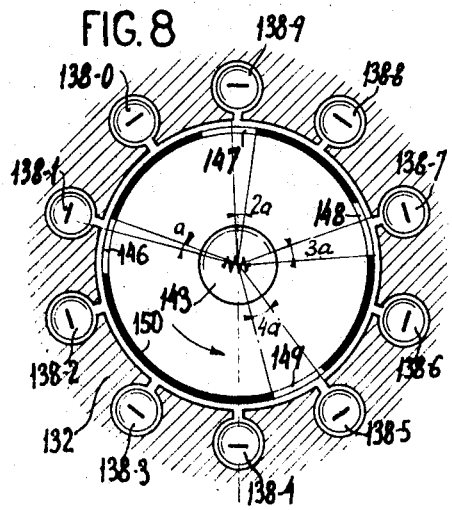
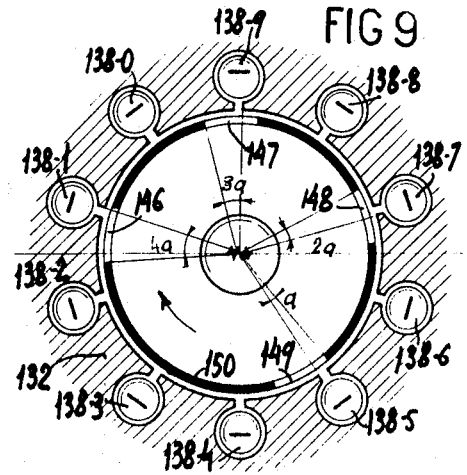
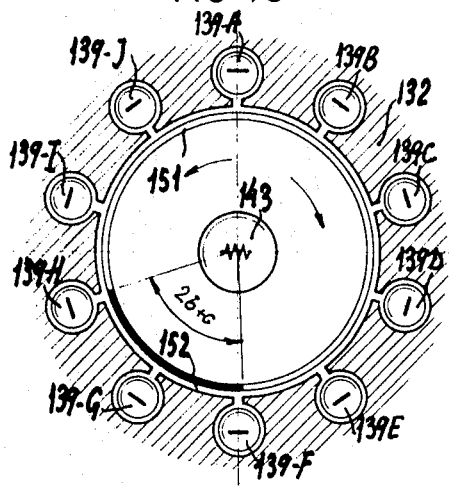
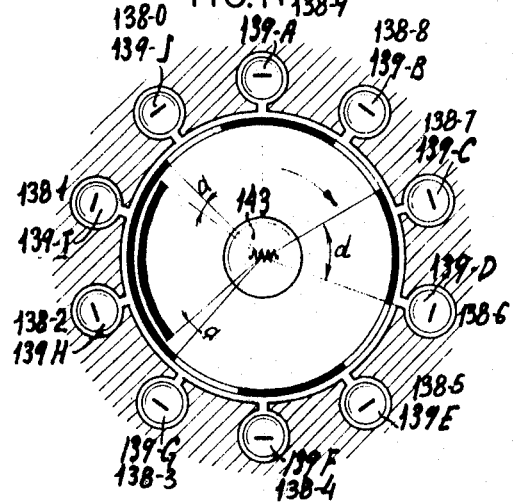
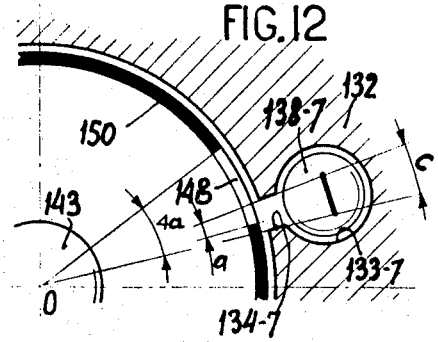
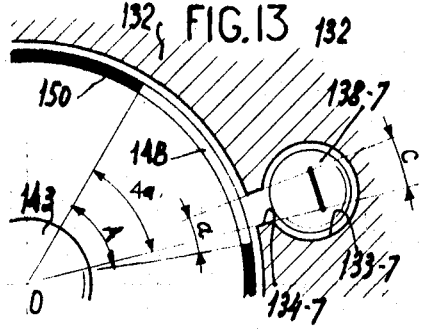

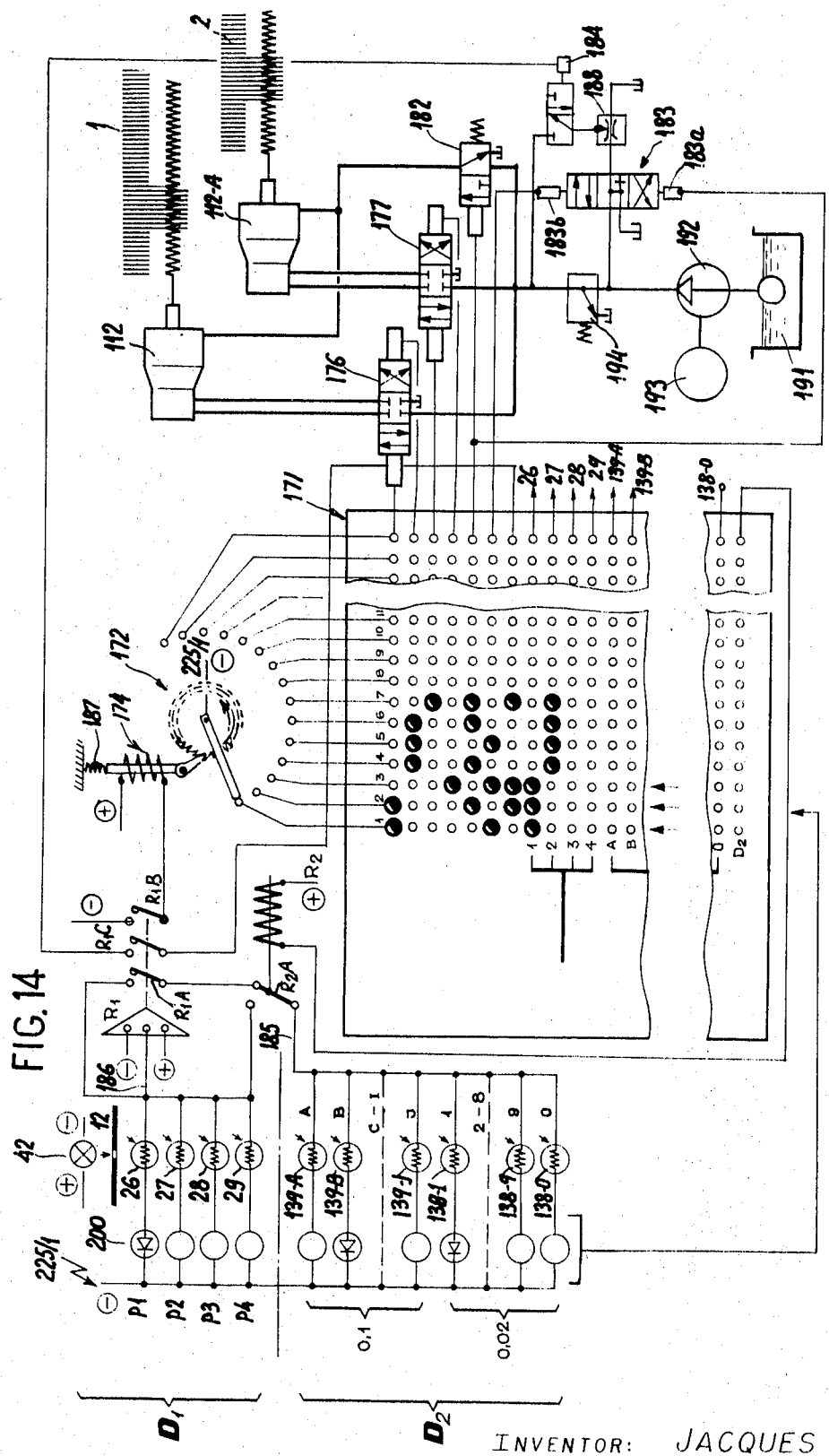

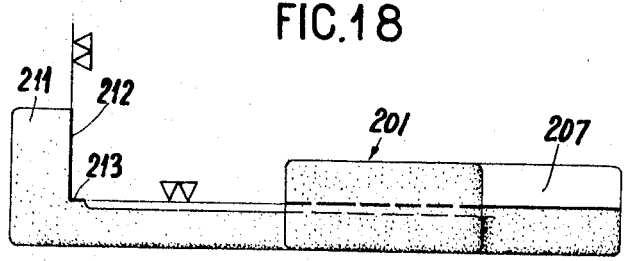
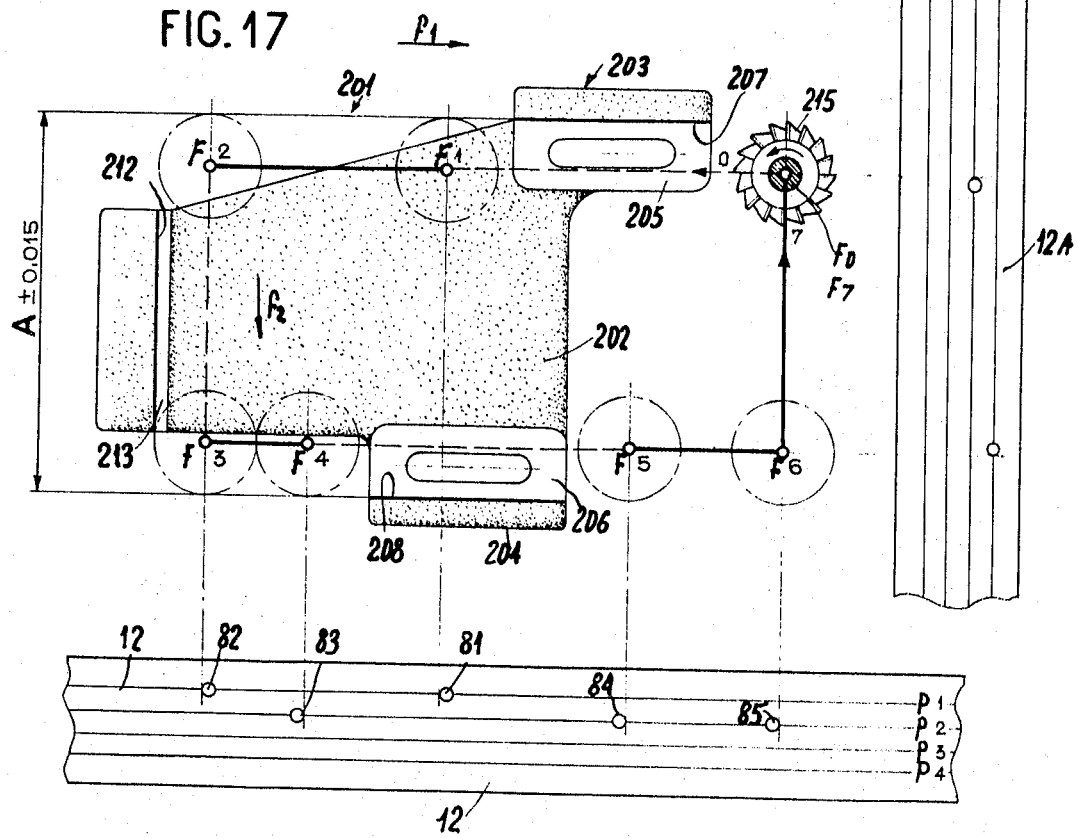

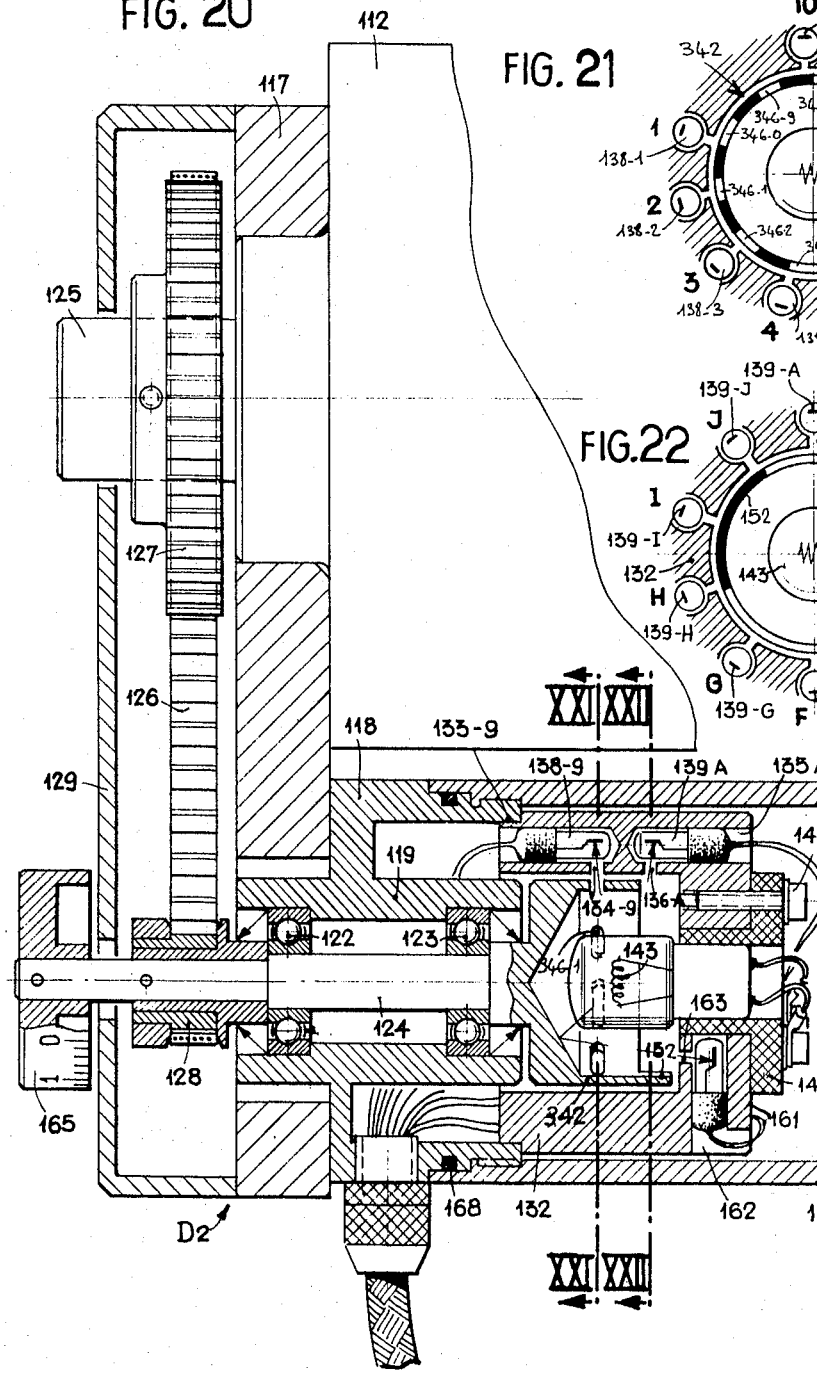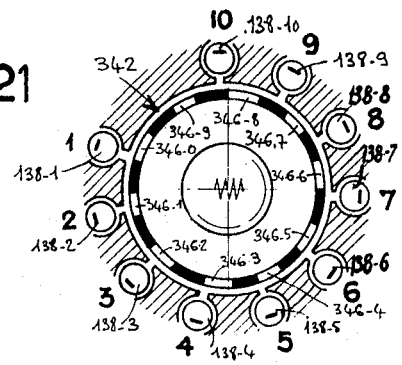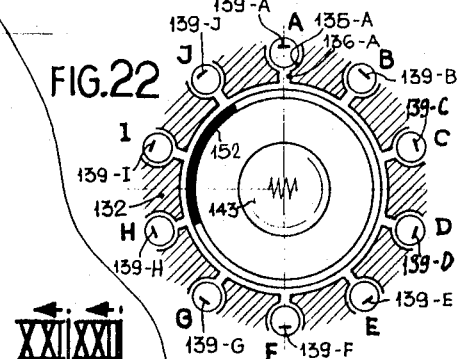

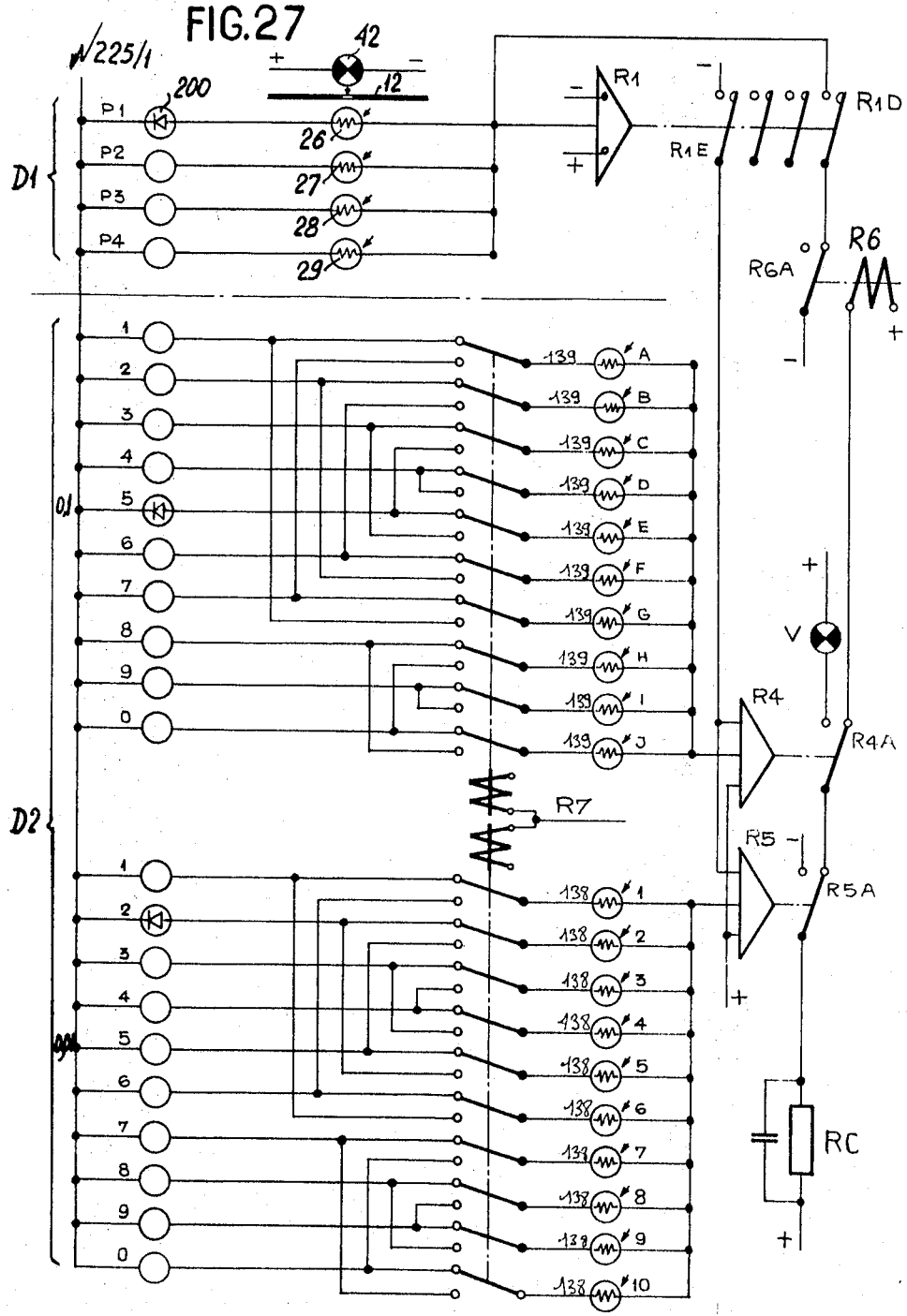

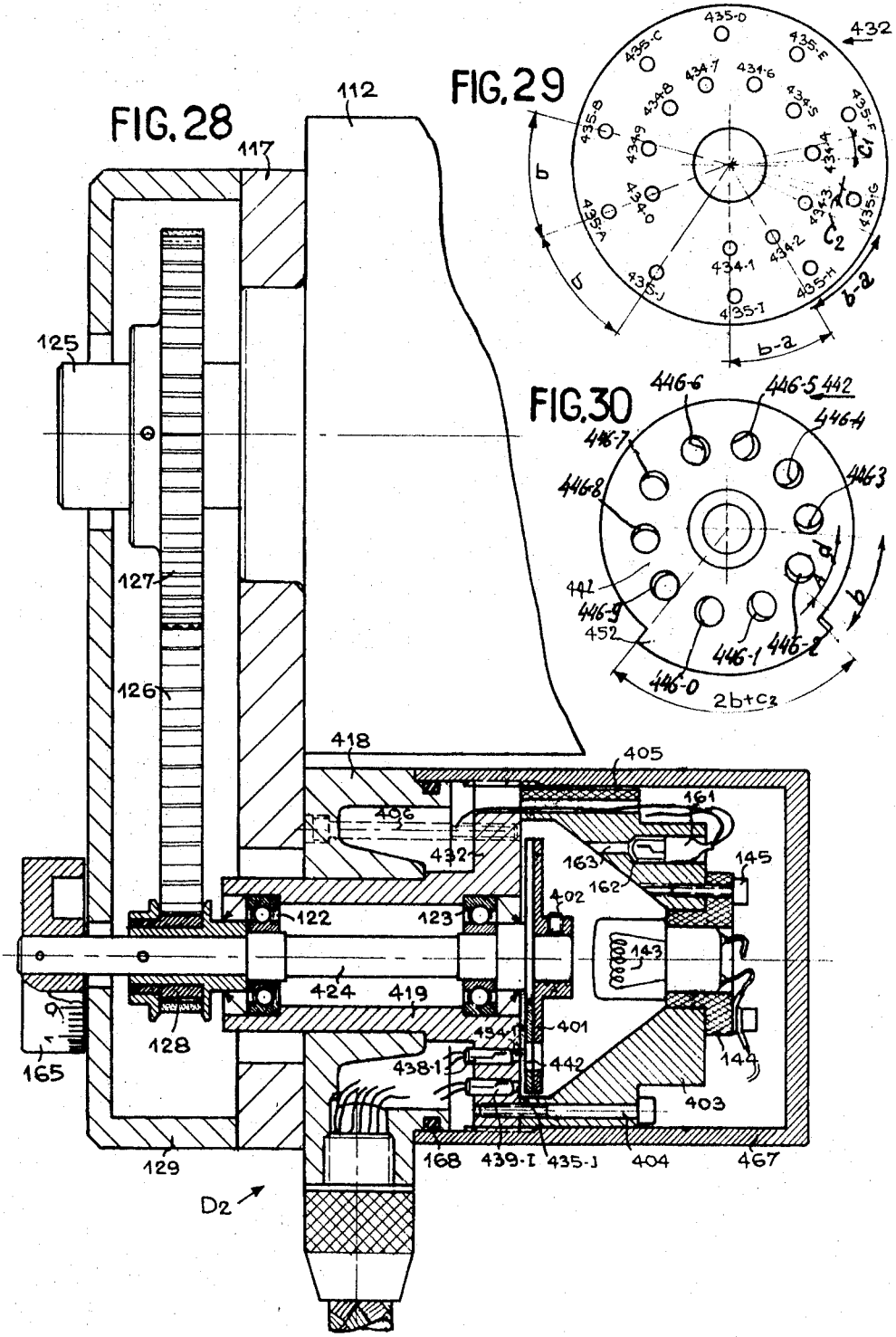

INSTALLATION FOR PROGRAMMED CONTROL OF A MACHINE-TOOL

This invention relates to the programmed control of machine tools, and particularly relates to and concerns automatic equipment for controlling the movements of movable members such as a workpiece support table, a table support carriage, a tool support, all in accordance with a machining program predetermined in terms of the dimensions of the workpiece to be formed.

These installations consist of, with respect to control of the movements of each moving part of the machine, a motor such as a hydraulic or electric motor for example, linked to a drive providing the movements of the member, such as a screw and nut drive, the running of the motor being subject to a programmer whose orders are given in response to a system for the detection of the exact positions which the moving member of the machine takes up, one after the other; in other words to a system for detecting the dimensions.

Systems exist for continuous detection of the dimensions, or for gradual detection or for sequential detection. The first of these systems are generally very costly. The second present the inconvenience of lacking flexibility and necessitating a great deal of time for adjustment, which reduces the profitability of their application, notably for operations of short duration. In fact, sequential detection systems of the simplest kind consist of a single direct contact mounted at the end of the travel of the moving member to be controlled, for example a stop or a cam having appropriate control, for example mechanical, electrical, electronic or hydraulic or even pneumatic, which determines the stopping of the organ and the programmed engaging of the next sequence. The encumbrance of these stops or cams and the difficulty of adjusting them in a precise manner limits, to a large extent, their capacity for being programmed and their flexibility of operation.

The primary object of the invention is to create a programmed control installation for a machine tool which does not present the above-mentioned inconveniences of the normal or prior art installations.

To achieve this, object in accordance with the invention, the installation which is of the type comprising, for each carriage, a feed control mechanism linked to a motor and a control system for the supply of the said motor, is noteworthy in that it comprises means for the detection of approach having average precision, for example of the order of 0.3 mm. by defect, such means being capable of covering on their own the extent of the total travel of the carriage, and means for the detection of the high precision stopping having accuracy of the order of 0.02 mm. The electrical supply control system for the motor is, by appropriate linking means, first of all subject to the means for detecting approach, the information supplied by these means for detection of approach causing the motor to be switched on and slowed down to a minimum constant speed at the same time as such means prepares the said connecting means such that the electrical supply control system is then subjected to the means for detection of the stop. The information supplied by these means for detection of the stop then causes the cutting off of the supply to the motor so as to ensure the accurate stopping of the carriage.

Given that the means for detecting the approach in such equipment do not have to supply precise information, they can be of a relatively rudimentary structure and, as a result, of low manufacturing cost. So far as the stop detection means are concerned, they only need to operate over an extremely reduced field, namely the area corresponding solely to the correction of the information supplied by the approach detection means with the result that, for example, a range of 1 mm. is very largely sufficient. In addition, their operation is much simpler than that of sequential detection systems and, moreover, the approach detection means are designed in such a manner that their programming element can be located outside the machine, this latter element not being put out of operation during any preparatory operation, which considerably increases the profitability of the installation.

The reliability of this type of equipment is also greater than that of installations with sequential control by cams or stops of the normal type, in view of the fact that there never is any occasion, during machining, to stop the machine tool, to remove and refit the protective arrangements for the detection system, in order to carry out the delicate adjustments for compensating for wear on tools.

In one embodiment of the invention, the approach detection means comprise a perforated multitrack tape according to the program to be carried out and a case of photosensitive elements, these two elements being supported, one by the carriage, and the other by the carriage support.

Such a perforated tape can be made at the study office without any difficulty, with an accuracy of the order of 0.3 mm. which is largely sufficient for perfectly correct functioning of the equipment. The machine is therefore not immobilized during this period of preparatory work which can be relatively long. However this is a piece of work which does not present any special difficulties and, in addition, since the perforated tapes each correspond to a machining cycle they can easily be stored and reused for carrying out a new series of identical parts.

In a particular embodiment of the invention the means of approach detection comprise a rotating drum linked to the feed control mechanism and forms a perforated screen mobile between a light source and photosensitive elements regularly distributed around the drum in a number corresponding to the accuracy required, and preselection means which can be programmed for the selective activating of the photosensitive elements, the apparatus being designed in such a manner that one complete revolution of the drum covers a length of carriage travel much greater than the length of travel corresponding to the degree of precision of the first means of detecting approach.

In a particularly advantageous arrangement, the approach detection means are formed from means for counting the revolutions of the above-mentioned drum for the means of stop detection. In this particular arrangement the two detections, approach and accurate stopping, are thus effected by using the same device.

In a more elaborate embodiment the installation also includes adjustable manual preselection means for the selective activating of the photosensitive elements of the stop detector as well as means of inversion to be used for placing the photosensitive elements such that they either depend on the programmed means for preselection or else depend on the adjustable means for manual preselection. Due to such means, it is possible to regulate the final detection by signs from a programmer with a view to obtaining an experimental and speedy finalizing of the stop dimension. In addition it is possible, at any moment in the automatic machining cycle, to modify the stop dimension, for example to compensate for tool wear, and this can be also done too from a desk at the programming unit. Finally, there is the possibility of immediately programming a preliminary cycle by comparison with the finishing cycle previously established to obtain the dimensions of the finished piece.

The invention will be better understood by reading the following description and examining the accompanying drawings which show, by way of nonlimiting example, some preferred embodiments of an installation for the programmed control of a machine tool according to the invention.

FIG. 2 is on a larger scale and is a plan view with cutaways of the approach detector shown in FIG. 1;

FIG. 3 is a vertical section along the broken line III-III of FIG. 2;

FIG. 5 is a view in longitudinal section, on a larger scale, of the accurate stop detector shown in FIG. 1;

FIGS. 6 and 7 are transverse sections made, respectively, along lines VI-VI and VII-VII of FIG. 5;

FIGS. 8 to 13 are views of the type similar to FIGS. 6 and 7, showing the members in different positions;

FIG. 14 is an electrical diagram of the installation for automatic programmed control comprising the detectors shown in FIGS. 1 to 7;

FIG. 17 is a plan view of a workpiece to be machined and it shows the machining cycle programmed accordingly by the equipment of FIGS. 1 to 16;

FIG. 18 is an elevation view of the part shown in FIG. 17;

FIG. 20 is a view in longitudinal section of another embodiment of the precise stop detector;

FIGS. 21 and 22 are transverse sections respectively along lines XXI-XXI and XXII-XXII of FIG. 20;

FIG. 27 is an electrical diagram of an installation for automatic programmed control comprising the detector of FIG. 20;

FIG. 28 is a view in longitudinal section of another embodiment of the precise stop detector;

FIGS. 29 and 30 are front views of the two coding elements of this detector.

The invention will now be described in its application to the programmed control of movements of a milling machine table 1 (FIG. 1) in two dimensions corresponding respectively to the longitudinal movements of said table on carriage 2 which supports it, and to the movements perpendicular to the preceding ones, of the said carriage on slide rails 3 of the bench 4 which supports it, but it would be applicable in like manner to the programmed control of the movements of a machine organ in three dimensions.

Figure 1:
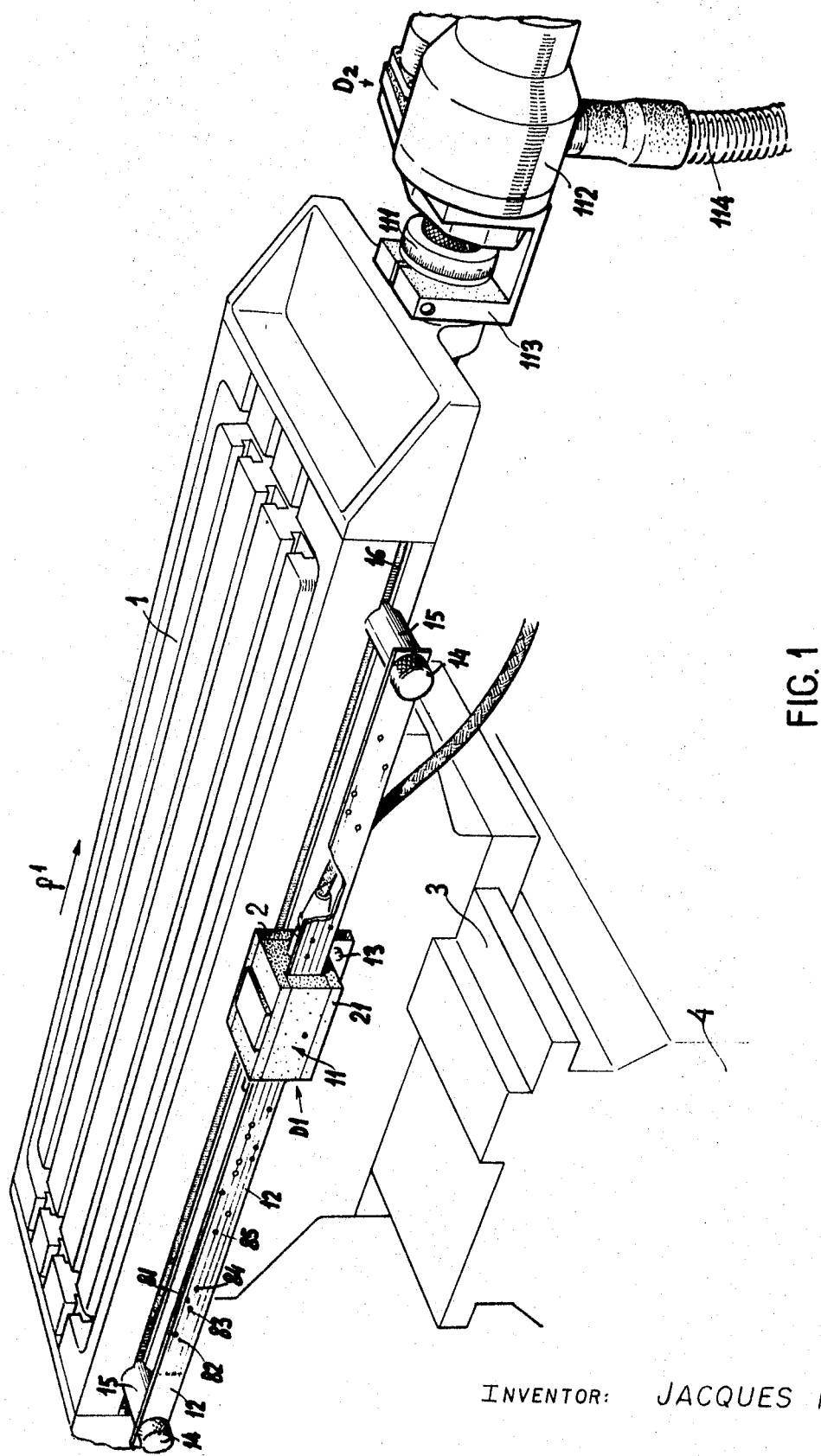
FIG. 1 shows in perspective a milling machine table fitted with a first embodiment of programmed control devices according to the invention.

The systems of programmed control in each of the three dimensions are identical so that there will now be described in detail only one of them, for example that concerning the longitudinal movements of the table 1 (FIG. 1). The data information unit comprises in this instance two photoelectric complementary detectors, namely: an approach detector D1 and a precise stop detector D2.

Figure 4:
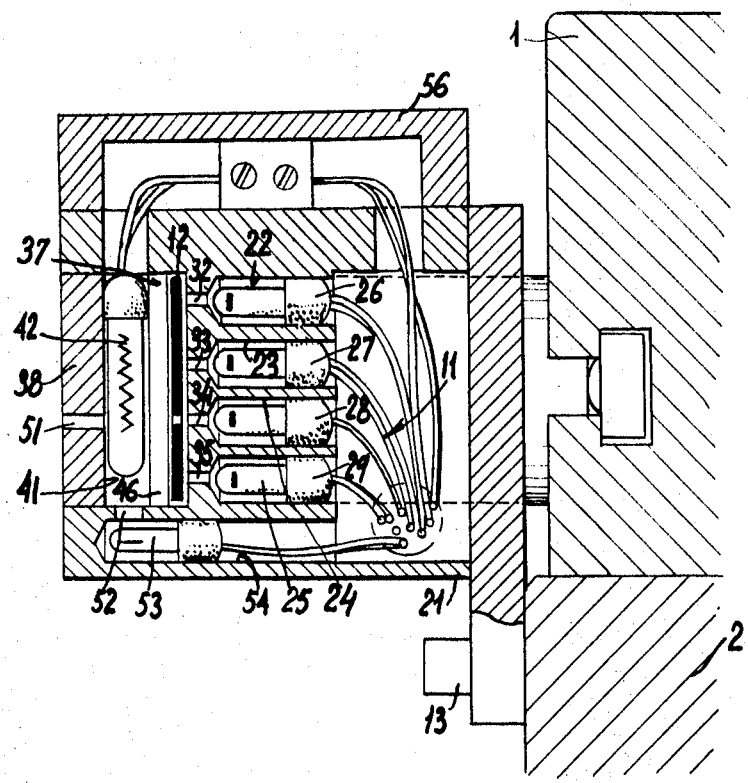
FIG. 4 is, on a larger scale, a vertical section along the line IV-IV of FIG. 3.

The approach detector D1, shown in detail in FIGS. 2 to 4, comprises a scanning head 11 with photosensitive elements and a tensioned perforated tape 12 which move, in relation to each other, during the longitudinal movements of the table 1. In the example, the scanning head is fixed to the carriage 2 by screws such as 13, while the perforated tape 12 is fixed, at its two ends, by means of two screws with milled head 14, to two solid pieces 15 engaging in a groove 16 of "T" section in table 1, and fixed in position by screws 17 cooperating with nuts 18 engaged in the base of groove 16 so that the perforated tape 12 is parallel to the longitudinal axis of the table, that is, to the direction in which this table moves on carriage 2.

The scanning head 11 comprises a case 21 (FIGS. 2 to 4) having a certain number (four in this embodiment) of horizontal holes 22, 23, 24, 25 arranged one above the other perpendicularly to the perforated tape 12 and enclosing photosensitive tubes 26, 27, 28, 29 respectively. Holes 22 to 25 communicate, respectively, through calibrated orifices 32, 33, 34, 35 with a guide channel 37 in which the perforated tape 12 can slide freely during the longitudinal movements of table 1. The front wall of the channel 37 is formed from a removable plate 38 which has a vertical hole 41 in which is mounted an electric lamp 42 with a long filament, capable of illuminating channel 37, to the right of orifices 32 to 35, through a calibrated vertical slot 46.

Through a hole 51 in the plate 38 can be seen the light of lamp 42; in addition this latter illuminates, through a hole 52, a photosensitive tube 53 mounted in a hole 54 formed in the thickness of the lower wall of the case 21. This photosensitive tube acts as proof of illumination of lamp 42. The case 21 is closed by a removable cover 56 which is removed for any replacement of lamp 42.

The power supply wires for lamp 42 and those for the photosensitive elements 26 to 29 and 53 pass into a junction 67 mounted in a sidewall of case 21 and into a flexible sheath 68.

The perforated tape 12 has several (four in the embodiment) tracks P1, P2, P3, P4 which permit avoidance of any dangers from interference to the inversions in the direction of movement of table 1. These tracks are each formed by a continuous line traced on the perforated tape 12 located to the right of each of the photosensitive elements 26 to 29.

The perforations, such as 81, 82, 83, 84 and 85 on the tape are made by any appropriate means, for example a hand punch, in a manner which will be described below.

The control unit for the longitudinal movements of table 1 comprises, in standard manner, a screw (not shown) mounted for rotation in the table and engaging in a nut fixed in the carriage 2. The screw is provided with a vernier 111 (FIG. 1) and it is driven by a motor unit with hydraulic control 112 fixed to table 1 by means of a support 113. The motor of this unit is fed by a supply tube and a fluid return tube lodged in a flexible sheath 114 by the intermediary of a distribution system which allows the motor to be turned as desired in one direction or the other and at different speeds, notably at a rapid approach speed, at an operating speed, and at a slow speed prior to stopping.

The precision stop detector D2 is fixed on one end face of the motor unit 112 (FIG. 5). This apparatus comprises a plate 117 on to which is fixed a cylindrical case 118 containing a boss 119 in which are mounted two ball bearings 122, 123 supporting a shaft 124 parallel to the shaft 125 of the motor unit 112. These two shafts are connected by notched belt control 126 which passes over a pulley 127 pinned to shaft 125 of the motor and over a pinion 128 pinned to the shaft 124. The multiplication ratio thus created between the two shafts is a function of the pitch of the screw moving table 1 forward. In the example being considered one turn of shaft 124 corresponds to an advance of 1 mm. of table 1. This belt transmission is protected by a box 129 fixed for easy removal to plate 117.

On the cylindrical case 118 is screwed an annular support 132 which has, distributed at regular intervals around its axis, a crown of 10 sockets 133-0, 133-1, 133-2, 133-3 .... 133-9 (see also FIG. 6) communicating with the inside of the annular support 132 by radial holes 134-0, 134-1, 134-2, 134-3 .... 134-9 as well as another crown of 10 other sockets 135A, 135B, 135C .... 135J (see also FIG. 7) communicating as well with the inside of the annular support 132 by their respective holes 136A, 136B, 136C .... 136J.

In the sockets 133-0 to 133-9 are arranged respectively photosensitive tubes 138-0, 138-1, 138-2, 138-3 .... 138-9 and, in similar manner, in sockets 135A to 135J are likewise lodged respectively photosensitive tubes 139A 139B, 139C .... 139J. These photosensitive tubes are preferably photoresistant cells or photodiodes.

The inner extremity of shaft 124 is fixed solid to a drum 142 mounted in the inside of the annular support 132 and enclosing an electric lamp 143 mounted in an insulating holder 144 itself fixed by screws such as 145 in the pierced base of the annular support 132.

To the right of the circular row of holes such as 134-0, 134-1 .... 134-9 the cylindrical wall of the drum 142 has a series of four windows 146—147—148—149 of identical dimensions. The circumferential arrangement and dimension of these windows are such at any moment as it turns in one direction or the other the drum 142 permits illumination of four photosensitive elements during a rotation of an angle $1a$, $2a$, $3a$, $4a$ then their occultation during a rotation of an angle $d$. In the example chosen the angle $a$ corresponds to a linear movement of the controlled table of 0.02 mm. In other words, for this embodiment, the establishing of the final dimension can be effected with a maximum deviation of ±0.01 mm. with reference to the actual dimension required.

To each window naturally correspond two multiple apertures blocking angle $a$ and corresponding to the two directions of rotation of the drum 142 (see FIGS. 8 and 9). The peripheral length of the window is a function of the definition chosen and the diameter of sighting of the photosensitive elements. Thus, if $a$ represents the minimum angle of control movement (or definition, here 0.02 mm.) and $c$ the angle of sighting of the photosensitive elements (angle at which the radial holes 134/0, 134/1 .... 134/9 are seen from the center 0) the angular aperture $\hat{A}$ of each window is equal to:

$$\hat{A} = 4a - c + a + 5a - c$$

The three full parts which separate among themselves the four windows 146, 147, 148, 149 have a peripheral length of $$d = 2 + c - c + a(5a - c) = 6a + c$$

To the right of the other circular row of holes such as 136-A, 136-B ..... 136-J the drum 142 presents a wide opening 151 leaving one part whole or masked 152 (FIGS. 7 and 10) whose axis of symmetry coincides with that of part 150 of the drum to the right of the row of holes 134-0, 134-1 .... 134-9 (FIG. 11).

We shall call $b$ the angle formed by the axes of sighting of two photosensitive elements which are consecutive. Angle $b$ corresponds to a linear displacement of the controlled table of =0.1 mm. ($b=5a$). The mask 152 is designed to determine an angular clearance of the drum 142 of $5a$ when the other stage of detection (FIG. 6) can determine at any time an angle rotation of value $a$, $2a$, $3a$, or $4a$.

The peripheral dimension and the angular adjustment of the mask 152 also permits the completing from an angle $a$ (in the two directions of rotation of the drum 142—FIG. 11) the last controlled position by the stage in FIG. 6.

According to a simple electrical diagram, as will be explained later, the stopping of motion can be determined by the total occultation of the sighting apertures of the programmed elements. In this embodiment, to permit an experimental adjusting of the machining dimension, there is therefore good reason for programming two sets of data of which one defines the 0.1 mm. and the other the 0.02 mm.

Since a first approach detection has permitted the establishment of the dimension by default to some tenths and hundredths of a mm. almost, it is easy to determine the actual dimension bearing in mind the effects of mechanical, electrical and hydraulic inertia of the whole of the control and command elements for the controlled table.

In the present instance it is supposed that the angle $a$ is less than angle $c$ (FIG. 12) but the same ratios would be applicable in an embodiment where angle $a$ was, on the contrary, greater than angle $c$, such as shown in FIG. 13 relative to a variation in which angle $a$ has in any case a different value from that in the embodiment shown in FIG. 12. In the instance mentioned it is supposed that the excess travel due to the inertias is in the order of 0.1 mm. That is why it is necessary to arrange, for the stage controlling the 0.02 mm., occultation masks $d$ (FIG. 11) whose angular adjustment is translated by a table displacement greater than 0.1 mm. This occultation prolonged beyond the excess stop travel is one of the important features of the invention. It permits the programming of the application of a simple electric control circuit of the sequential type.

At each 0.1 mm. of the stage in FIG. 7 it is possible to program alternatively to complete to 0.02 mm., 0.04 mm., 0.06 mm. or 0.08 mm. one of the four photosensitive elements in even order and then one of the four photosensitive elements in odd order of the stage in FIG. 6. The operator thus has available one window with continuous illumination with a maximum dimension of 0.78 mm. and adjustable by 0.02 of a mm. from zero.

It can be supposed, by way of example, that by default the first detection D1 positions the controlled table at a point such that the drum of detector 142 occupies the position shown by FIGS. 8 and 10.

The operator reads on the vernier 111 (FIG. 1) the dimension attained and sees that there is still 0.14 mm. to be travelled, for example, in order to attain the desired dimension. He has available vernier 165 to let him know at this moment the position of the internal drum 142 and, in addition, a graph which has been specially drawn up enabling him to know "a priori" the combinations to put into operation manually (by means of rotators), that is to carry out manually the adjustment of the precise stopping of the second detector D2.

In the example under consideration, it is necessary to program the combination 139-1 (FIG. 7), 138-6 (FIG. 6) so that after occultation of the photosensitive element 139-1 and the photosensitive element 138-6 the drum 142 has turned through an angle representing the movement of 0.14 mm. desired. The graph which the operator has takes account of the average response time of the different movements which can be carried out on the machine under consideration. It is therefore very possible that this first attempt does not allow the attainment of the rigorous dimensions required in view of the possible peculiarities of the parameters of inertia operating at the dimension and displacement desired.

There will then be grounds for reading again the vernier 111 (FIG. 1) of the machine for the position attained by the controlled table and on vernier 165 the position occupied by drum 142. All that remains to be done is to correct once again the message so that the second detector D2 is conditioned for stopping at the close dimension.

The interest of the device therefore lies in being able to carry out experimentally under the same conditions as will operate during the automatic cycle the manual adjustment of the positioning obtained in successive approximations.

The control of the luminosity of the lamp 143 is effected by a photosensitive tube 161 mounted in a radial hole 162 of the base of the annular support 132 communicating with the interior of this support by a hole 163 in the longitudinal direction. Thus, when lamp 143 is lit, its illuminating rays are reflected on the internal base of the rotating drum 142 and reach the photosensitive tube 161 through hole 163.

A stopper 167 screwed on to the box 118 closes the whole of the unit in moisture-tight manner due to the presence of a joint 168.

In FIG. 14 there has been shown schematically the main part of the system of automatic control associated with the detectors described above. In this sketch will be found detector D1 and its four photosensitive cells 26, 27, 28, 29 capable of being stimulated through perforations in the tape 12 by lamp 42; the detector D2 with its 10 photosensitive cells 139A to 139J and its 10 photosensitive cells 138-1 to 138-0; and the motor unit 112 for controlling the feed screw for table 1 as well as a motor unit 112A for driving the control screw for the feed of carriage 2.

The detector D1, through the intermediary of a contact R1B of a relay R1 stimulates the coil 174 of a selector 172 of any appropriate standard type having as many preselection contact studs as the device itself is fitted with possible sequences of machining.

Figure 15:
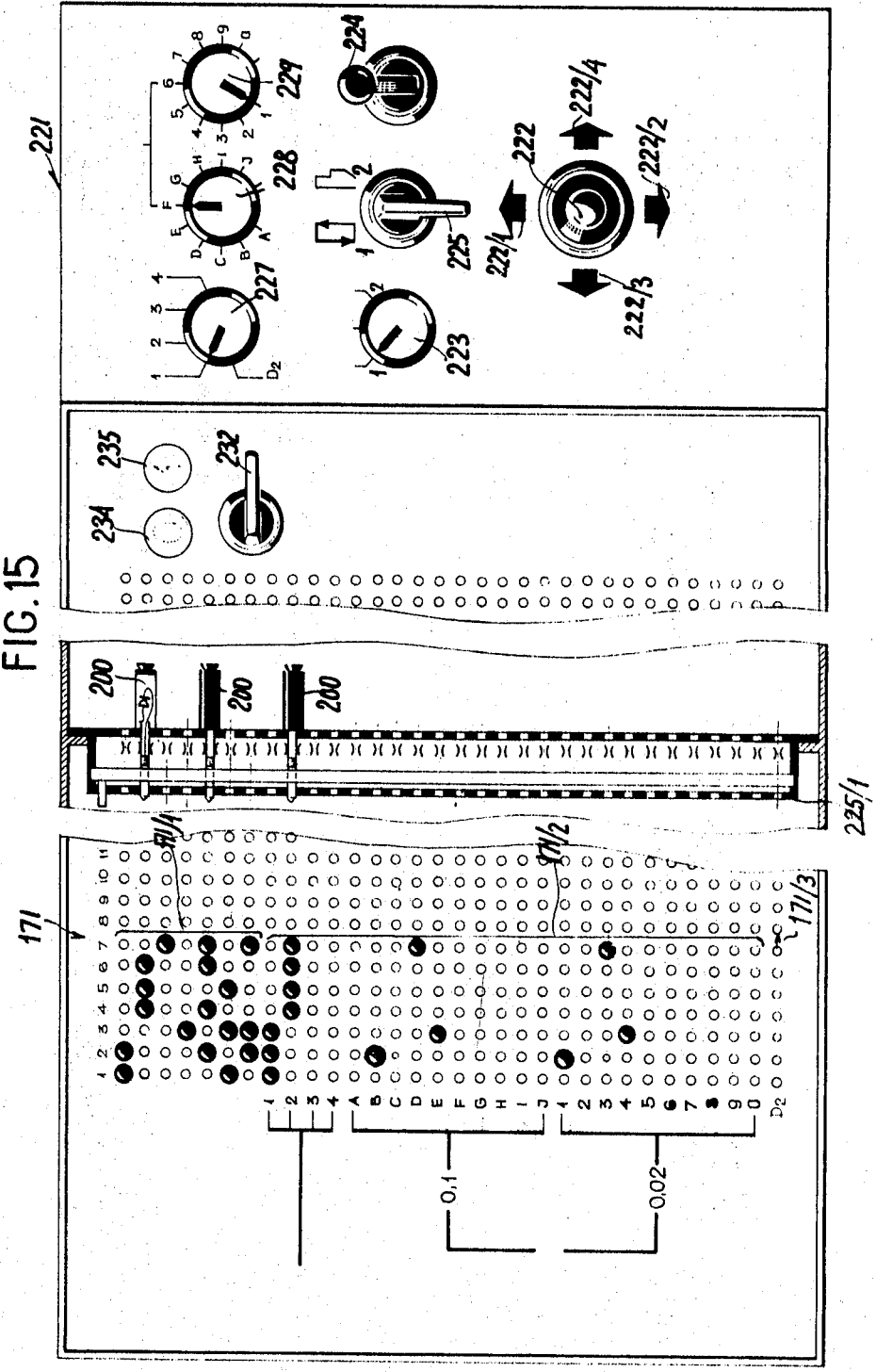
FIG. 15 shows, on a larger scale, with cutaways, a programming master and a control desk.

The selector 172 serves to supply successively columns (of which the first 11 have been enumerated in the drawing) of a matrix 171 utilizing plug-in diodes 200 (see also FIG. 15). The horizontal lines of this matrix correspond to the different parameters of all the possible sequences, namely, in the example: longitudinal movement of the table to the right, longitudinal movement of the table to the left, transverse movement of the table forwards (that is corresponding movement of the carriage supporting the table), transverse movement of the table backwards, then fast speed, working speed, slowing down speed, then the selection of the four tracks of the tape, selection of the 10 photosensitive cells 139A to 139J and finally the selection of the 10 photosensitive cells 138-1 to 138-0. The last line of the matrix shown as D2 plays a special role to which reference will be made later.

The outlets of the different lines on the matrix correspond to the parameters shown, namely the first line to the stimulation of an electrovalve 176 for supplying the motor unit 112 with longitudinal movement of table 1 to the right, the second to the same electrovalve 176 stimulated in the other direction, the third and fourth lines to stimulation of an electrovalve 177 for supplying the motor unit 112A, in one direction or the other, for movements of the carriage 2.

The outlet of the line marked "fast speed" is linked to two electrovalves 182 and 183. Electrovalve 182 conditions the direct intake of the motor units 112, 112A. Electrovalve 183 in its neutral position, as shown, fills pump 192 directly from the tank. Stimulation of coil 183a of this valve causes the closing of the release circuit and forces the whole supply in the pump to drive motors 112 or 112A.

The outlet of the line marked "working speed" is linked to coil 183b of electrovalve 183 which then forces a part of the pump supply to pass through a flow regulator which can be adjusted 188 on its way back to the tank so that the other part of this supply, likewise variable, is led to the motors 112, 112A.

The outlet of the line marked "slowing down speed" is linked to an electrovalve 184 by the intermediary of a shutoff contact R1C of the relay R1 which pilots the flow regulator 188 in the direction of its maximum opening.

The outlets from the four lines corresponding to the four tracks P1, P2, P3 and P4 of the perforated tape are linked respectively to the four photocells 26, 27, 28, 29.

The outlets of the twenty lines A, B, C .... J and 1,2,3.... 9, 0 are linked respectively to the corresponding photocells 139–A, 139–B .... 139–J and 138–1, 138–2, .... 138–9, 138–0, respectively.

The outlet of the last line "D2" is linked to the stimulation coil of a relay R2 for activating a reversing contact R2A.

In the drawing in FIG. 14 there has once again been shown: a liquid reservoir 191, a pump 192, an electric motor 193 for driving this pump, a safety release valve 194.

In FIG. 15 there has been shown, apart from the matrix 171, a control panel 221 on which are found, for adjustment by manual control of the machine, an inching lever 222 for controlling movements of the table and the carriage in one direction or the other, a selector for fast speed or working speed 223, a pushbutton 224 for controlling the switch to minimum speed, an inverter 225 whose function will be explained later, a track selector 227, a selector for correction in tenths of millimeters 228, and a selector 229 for correcting to 0.02 mm. Also shown is a handle 232 entitled "Manual search of sequences" by means of which it is possible to move the selector 172 forward, step by step, at any time.

Two pilot lights 234, 235 show together the number of order of the sequence to which the inching selector 172 is connected.

FIG. 61 depicts an electrical diagram relating to the control panel 221 whose components have just been described. On it are found the same member designated by the same reference numbers. The inching lever 222 serves to lock in the different live positions contacts 222/1, 222/2, 222/3 or 222/4 respectively.

Programming of the precise stop by detection D2 of the controlled movement and of the start of the following movement are carried out plugging in diodes such as 200 (FIG. 15) into the matrix 171 for control of the automatic cycle or by simple manipulation of the three turning buttons 227, 228, 229 for so-called manual control of adjustment.

There will now follow, in the first instance a description of automatic control, taking as an example sequence 2 whose signalling and detection circuit are shown in FIG. 14. By standard utilization of the matrix 171, supply current 225/1 vertically distributed by selector 172 is switched horizontally in accordance with the signal, on one hand on to the photoelectric cell 26 of the detectors D1 and, on the other hand on to the photoelectric cells 139–B and 138–1 of the detectors D2.

These different photoelectric cells allow the current 225/1 to pass when they are illuminated: note should be taken of their method of connecting in parallel. The chronological functioning of the two detectors is as follows: in the first stage, the movement being programmed by a longitudinal movement to the right at fast speed with slowing down at the end, the corresponding control means, brought into operation as already described, determine the movement of table 1.

The movement of this table displaces the perforated tape 12 of the detector D1 in such a manner that a predetermined perforation on track P1 allows, at a particular moment, illumination of the photoelectric cell 26.

As a result, current 225/1, released at this moment, reaches the amplifying relay R1 (FIG. 14) whose contacts R1A, R1B, R1C close; the autosupply contact R1A switches on, to the control circuit of the relay R1, a maintenance current 185 from the detector D2 operating at that moment.

The direct supplying of the amplifying relay R1 by circuit 186 is maintained until total occultation of the lighting of the cell 26 and, by means of the autosupply circuit 185, this relay stays under supply until the total occultation of the photoelectric cells 139B and 138–1 of detector D2.

As has been already explained the different windows of the drum 142 at the stages in FIGS. 6 and 7 of the detector D2 make it possible to maintain illumination of the two photoelectric cells chosen angularly in a fixed and accurate manner in space with relation to the turning masks for final stopping of the sequence then running. The programming matrix 171, by its first seven horizontal lines 171–1 (FIG. 15) makes it possible to control the control means of the motor units 112 and 112A and by its following 24 horizontal lines 171–2 makes it possible to ensure, at precise moments in time, the cutting in and out of the amplifying circuit R1.

This relay includes, independently of the autosupply circuit R1A, the two circuits controlled by its shutoff circuits R1B and R1C.

Upon switching in of the amplifying circuit R1 the contact R1B charges the electromagnet 174 which prepares the inching selector 172. Upon switching out of the relay R1 the electromagnet 174 is once again uncharged and the ratchet mechanism is recalled by spring 187 which causes the selector to move forward one step, from position 1 to position 2, for example, cutting off the supply to the functions programmed in column 1 in order to control those of column 2. Thus each switch out of the amplifying relay R1 causes successively the feed from left to right the feeding of each column of the programming matrix (FIG. 15) whose switching into circuit is shown by tubes 234 and 235 (for example No. 1 in the position of the selector 172 shown in FIG. 14). Upon switching in of amplifying relay R1, the contact R1C also closes and, if a slowing down is programmed on the matrix for sequence No. 2, a supply current 225–1 reaches, at this moment in the sequence, the electrovalve 184 which pilots the flow regulator 188 controlling the reduced forward feed of the final travel.

The last horizontal line 171–3 designated "D2" on the matrix has as its function the control of the relay R2 which switches the circuit 185 to direct control of the amplifying relay R1. This permits increasing the correction capacity of the detector D2. In fact, in the proposed embodiment, the maximum dimension of the illuminating window is 0.78 mm. which can sometimes be too limited. If, for example, after carrying out the maximum correction, the dimension is still not attained, one simply needs to program a new sequence with the same data as the previous one, but with D2 signalled to obtain a movement of 1 mm. more (total capacity of detector D2). Thus, by this detection of every turn of detector D2 corresponding to 1 mm. travel of the table, a new sequence is initiated and an accurate dimension can be obtained at several millimeters distance through counting by means of the selector 172 and with final detection as previously described.

Figure 16:
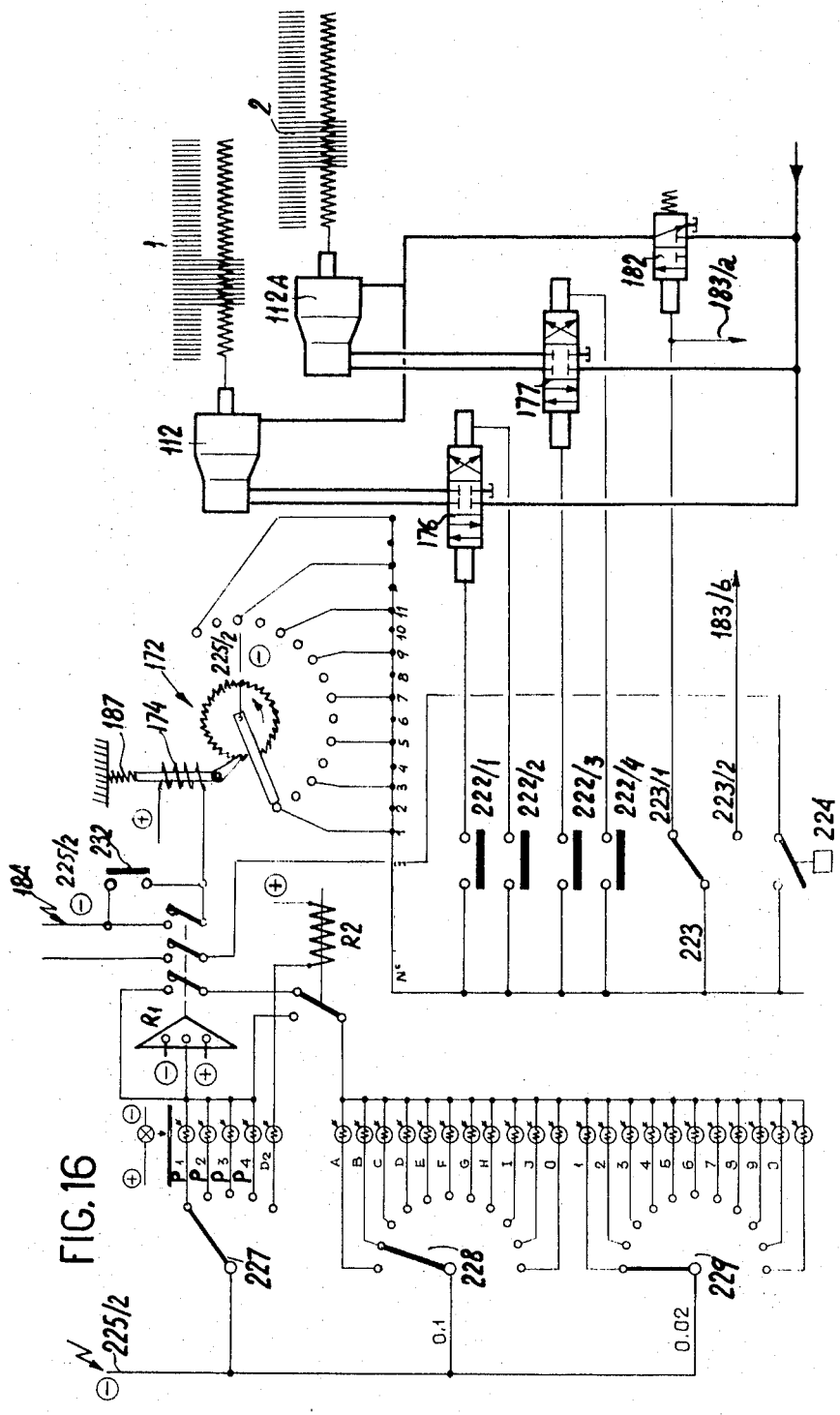
FIG. 16 is an electrical diagram of the manual control equipment.

For operating with manual control of the programming of the device, the operator has a desk or panel 221 (FIGS. 15 and 16) which allows him to search the signalling of the corrections to be made, sequence by sequence, to the approach detection D1 so as to ensure the accurate dimension of machining. On this desk, the two-way switch 225 distributes, in a distinct manner, a supply current when the button is placed in position 225-1 of the "automatic cycle." The selector 172 is fed as has been described previously and shown in FIG. 14. If this same switch is placed in position 225/2 of the "manual cycle" it distributes a supply current 225/2 to the inching selector 172, on another distribution stage from the previous one, and to the turning buttons 227 — 228 — 229 according to FIG. 15 and as illustrated in FIG. 16.

The operator can then simulate all the functions of a sequence from the buttons 222 — 223 — 224 (FIG. 15) which controls the command of the motor units 112 and 112A.

The manipulator 222, operated in instinctive manner according to the 4 directions 222/1----3--A'4, controls the electrovalves for distribution 176 and 177 (FIG. 16) at fast and working speed, depending on the position of the turning button 223 with the possibility of slowing down at the end of travel by switching off button 224.

The table, now controlled manually by operating manipulator 222, is directed in the proposed direction of machining, for the sequence intended, and drives the perforated tape 12 for approach detection, in such a way that a predetermined perforation on the track chosen by the turning button 227 (FIGS. 15 and 16) enables the illumination of the photoelectric cell switches on to control the amplifying relay R1. In addition, and in the same way, the turning buttons 228 and 229 will simulate the operation of the matrix for signalling the combinations for final detection of the controlled detector D2. Once the operator has simulated the automatic functioning of a sequence by means of the desk pushbuttons he can control this whole sequence by keeping closed one of the contacts 222/1—B2—3 or 4. At the end of travel, after switching out the amplifying relay R1, selector 172 advances one stage and cuts the supply 225/2 to all the control and detection elements (FIG. 16). Halting of the controlled table having now taken place, the operator can check the dimension attained from the vernier 111 of the table.

To enable a new start by table 1 or carriage 2, it is necessary to maneuver button 232 which moves forward by a new stage, the selector 172 for a new supply 225/2 to the command and control elements on desk 221. It will be noted that supply to the elements in response to the operation of button 232 through the intermediary of selector 172 is ensured only in one stage of two of the selector so that the release of one end of sequence causes the stopping of the table even if the button for manual control 232 is kept in the operating position. In addition, given the fact that the manual control of the machine activates the same electronic and electric components (notably the step by step advance selector 172) as the control in automatic cycle, the adjustment of the precise stops takes place accordingly in the same circumstances, notably the conditions of inertia, for release of the sequences.

Manual control of button 232 also allows the moving forward of the selector 172 as many stages as is necessary for searching for a determined sequence still signalled by the indicator tubes 234 and 235. After manual adjustment of a sequence with the help of desk 221, the operator can report by pins all the driving information on one column of the matrix 171 and position, with the aid of button 232 and indicators 234, 235, selector 172 for carrying out this sequence. When the switch is turned to 225 "automatic cycle," the whole of the programming is then conditioned and the tested manual sequence is repeated automatically. Step by step, using successively the desk 221 and the matrix 171, the operator can carry out a machining cycle prepared in the Methods Office and regulated with accuracy from the programmer (without interfering with the machine or the detector D1). This cycle can be readjusted by means of the matrix, at any time for example to compensate for tool wear or to correct any kind of displacement.

With a view to maintaining the adjustment made on the matrix, for subsequent manufacture of another series of parts, it is possible, on a roll on which are printed the columns and lines of the matrix, to make perforations at the positions of the pins so that, to carry out the manufacture of a new series of parts, it will be necessary only to place the perforated roll on to the matrix and to push a pin into each hole in the roll, the pin thus ensuring the corresponding links with the matrix. The roll stays in place during operation.

The functioning of the unit will now be explained with reference to the machining of a workpiece of the type shown in FIGS. 17 and 18. This piece, shown in its entirety by 201, is a support incorporating a flange 202 which is to remain rough and, projecting from this flange, on one hand, two slides, 203, 204 having respectively a flat horizontal face 205, 206, in a common plane and two flat parallel vertical faces 207, 208. The flange 202 also has a raised edge 211 presenting a transverse vertical face 212 and a small horizontal face 213. The machining of this piece therefore includes successive truing operations carried out by means of a vertical milling cutter 215, namely: truing of the horizontal face 205 and the vertical face 207 of the slide 203, truing of the vertical face 212 and the horizontal face 213 of the raised edge 211, and finally, truing of the horizontal face 206 and the vertical face 208 of the slide 204.

The workpiece 201 is secured, flat, on the table of the machine in such a way that the slides 203 and 204 are parallel to the longitudinal axis of the table.

F 0 indicates the position of the milling cutter 215 at the start of the machining cycle. The height of the cutter and the position of the table on the transversal carriage 2 are such that the first longitudinal move forward of table 1, in the direction of the arrow $f1$ effects the truing of the horizontal face 205 and the vertical face 207. This movement of the table must be made at a speed equal to the feed speed of the work. As soon as the milling cutter is lifted from the surface 205 which it has just machined, that is, when it occupies the position F1, the table of the machine can assume a fast speed as far as the vicinity of position F2, then a slow speed to stop exactly at this point, corresponding to the machining of the vertical speed 212 and the vertical face 213 of the workpiece by displacement of the transversal carriage 2. It is supposed that the horizontal face 213 is at the same level as that of the faces 205 and 206 of the two slides to be machined so that, for the example in question, there is no need to consider vertical movement of the table or the cutter.

The principle would be the same if it were necessary to add such a movement.

After machining of the faces 212 and 213, the cutter is located in position F3 in relation to the workpiece. The table will now move in the direction counter to arrow $f1$ at fast speed until the cutter is in position F4. The speed of the table is then reduced and corresponds to the machining speed for truing of the horizontal face 206 and the vertical face 208. The cutter then reaches position F5 and the table speed can, once again, be increased until the cutter reaches the position F6 from which, by a transverse movement of the carriage in the direction of the arrow $f2$ the cutter reaches position F7, that is, it is once again in the first position F0 of the start of the cycle.

It will be noted that the second, third and seventh sequence, at the end of which the cutter should occupy respectively positions F2, F3 and F7 are the only ones for which the position of the workpiece must be determined with great accuracy since they determine the positioning of the vertical face 212, the vertical face 208 and the vertical face 207 (for the following cycle) respectively. In fact, the points F1, F4, F5 at which the speed of the table must be modified in the longitudinal direction and point F6 where it has to be stopped at the end of a cycle, have absolutely no need to be accurate since they do not determine any machining dimension of a face on the workpiece.

The result is that, for the first seven sequences of the cycle in question, although the approach detector D1 must obviously be used for each sequence, the precision detector D2 will not require to come into action except for ascertaining the positions F2, F3, and F7.

To prepare the machine the following procedure is recommended: In the study office itself, on the industrial drawing of workpiece 201, are glued tapes 12 and 12A (FIG. 18) for programming which are intended to be read by the approach detector D1 on longitudinal movement and the corresponding approach detector (not shown) of transverse movement of the carriage 2. The travels of the table and the carriage for the various machining sequences are transferred by laying them out in a suitable manner on the tracks of the said tapes so that there is no risk of interference in the changing of the directions of advance of the table 1 and the carriage 2.

When all the movements in the cycle have been traced, which can be done very easily with an accuracy in the order to 3/10 mm. without any difficulty, the tapes are perforated, notably tape 12 at the points 81, 82, 83, 84 and 85 systematically some tenths of a mm. ahead of the actual dimension, taking into account the direction in which takes place, every time, the relative advance of the workpiece and tool.

The perforated tapes are put in place on the machine and the operator then controls the different movements with the programmer under manual control. At the end of movement materialized by a perforation in the tape, one of the photosensitive tubes 26 to 29 of the detector D1 is stimulated and commands in the programmer a slowing down of the speed of the table which continues its travel until total occultation of the light to the corresponding photosensitive tube.

For the positions F2,F3,F7 the operator reads, on the vernier 111 of the feed screw of the table, the dimension reached. This is, in principle, always lower than the actual dimension by some tenths of a mm. as has been explained above. In this way is known the difference between the actual dimension and the dimension already reached so it is now a question of programming the correction essential for the preparation of the work of the precision detector D2. As a function of the position of the drum 165 of the precision detector one signals at the desk 221 the electrical combination envisaged for searching the additional displacement necessary and to obtain the accurate stopping of the table at the end of the sequence, as explained above.

After trails the operator completes the program of the matrix by signalling the electrical combinations tried, for example, as shown in FIG. 15, the pins B and 1 for the position F2, the pins E and 4 for the position F3, and the pins D and 3 for the position F7.

Figure 19:
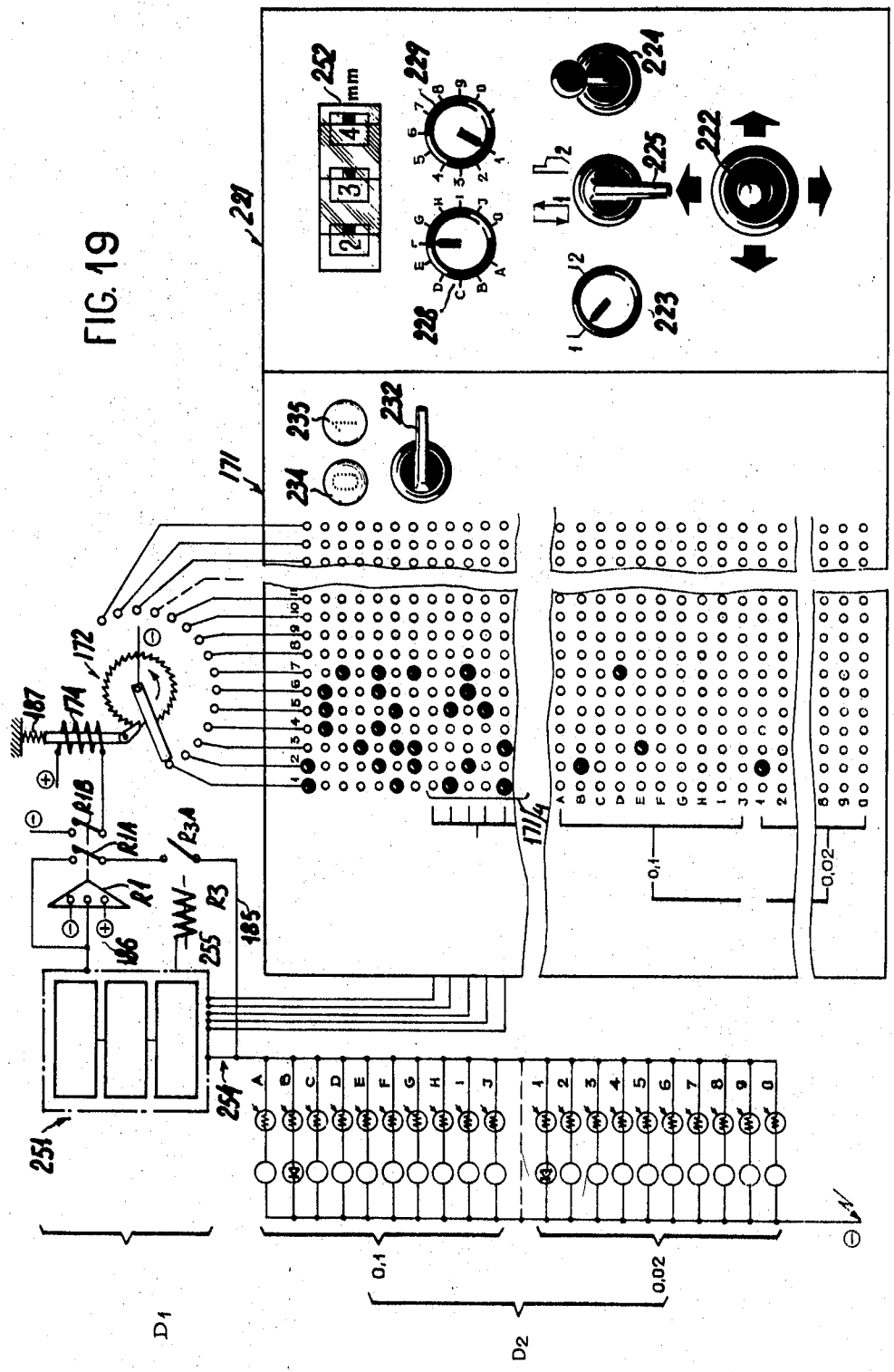
FIG. 19 is a similar diagram to that in FIG. 14 for another embodiment.

In FIG. 19 there is schematic representation of another embodiment of a programmed control installation for a machine tool which differs from that described above in that the means for the detection of approach, instead of being made up of a photosensitive system of reading a perforated tape which is part of the moving table, are made up of a counting unit which counts backwards the revolutions of the drum 142 (FIG. 5) of the detection device so as to ensure accurate stops.

This counting unit is designated, in a general fashion, by 251 in FIG. 19 and it controls the relay R1 in the same way as the perforated tape detector in the embodiment described above. The common elements to both embodiments in FIGS. 14 and 15 on one hand, and FIG. 19 on the other, are designated by the same reference numbers. There is no longer a track selector for there are now no tracks. On the contrary, the elimination of the tape and, as a result, the perforations, has necessitated the creation of a supplementary zone 171/4 on the matrix 171 in order to materialize, by pins, the dimensions of displacement by error, for each of the sequences, in the form of a decimal or binary signalling system as well as a set of switches with manual control 252 carrying out preselection of the dimension to be obtained by default and preparing the counting unit for the start of the sequence to be carried out.

Apart from the changing of the approach detection means, the operation of the unit in FIG. 19 is, in broad outline, the same as that of the unit in the preceding FIGS. and it benefits from the same advantages.

In automatic cycle, the starting off of a new sequence prepares the counting unit for a travel of 234 mm. for example. The movement of the workpiece support table is controlled in response to the signalling of the first seven lines of matrix 171. Detector D1, at every millimeter of the travel of the table, provides an electrical impulse through circuit 254 (FIG. 19), which causes a backwards recording of 1 unit in the counting unit 251. Five millimeters before the final dimension a fixed preselection controls the supply to relay R1 by circuit 186, and consequently the changing of the table to its slow speed.

At the moment when the dimension of error of 234 mm. is reached, that is when the counting unit 251 shows zero, another fixed preselection controls a relay R3 which closes the circuit 185 for autosupply of the relay R1 for the switching on of the final detection D2. When the strict dimension is reached, the amplifying relay R1 is switched off, the controlled table stops and a new sequence commences.

As regards manual control, use is made of the same elements as in the embodiment described above, with this difference, that it is necessary to signal, for each sequence, the dimension of displacement by error since the perforated tape is no longer available to locate the positions at the end of sequence.

Finally, for the production of parts which require no precision, it is enough to have a programmed control which brings into operation only the approach detection means. For this all that is needed is not to signal any measurement on the precise stopping means, that is, on the matrix.

As a variation, in FIG. 20, is shown another embodiment of a precise stop detector D2 fixed to a one face at the end of the motor unit 112 which is part of the installation for the programmed control of a machine tool described above. This precision stop detector D2 is derived from the one shown in FIG. 5, many identical elements of which it includes and which are designated, in this FIG. 20, by the same reference numbers as in FIG. 5. Here a description will be given only of the elements of this detector which are different from those of the detector already described.

Figure 25:
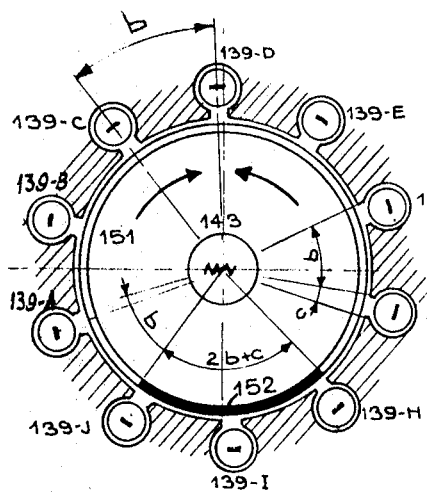

The photosensitive elements 139–A, 139–B, 139–C ....... 139–J (FIGS. 20 and 22) of the first stage of detection are still regularly distributed in a crown and angularly separated one from another by an angle "$b$" (FIG. 25). The mask 152 which works in conjunction with these elements is carried on the drum 342, as in the embodiment described above.

The revolving coding drum is designated by 342 and the part of this to the right of the crown of photosensitive elements 138–1,138–138–2,138–3 ...138–10 of the second stage of detection has 10 windows 346–0,346–1,346–2...346–9 angularly equidistant and identical in size.

Figure 23:
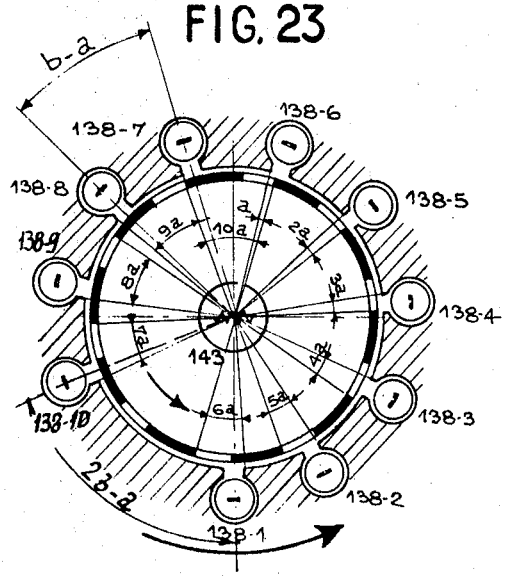
FIGS. 23 to 26 are views of the type shown in FIGS. 21 and 22, showing the members in different positions.

As will be described later, the angular distance between the two particular photosensitive elements 138–10 and 138–1 is greater than the constant angular distance between all the other photosensitive elements in this crown (FIGS. 21 and 23).

Figure 26:
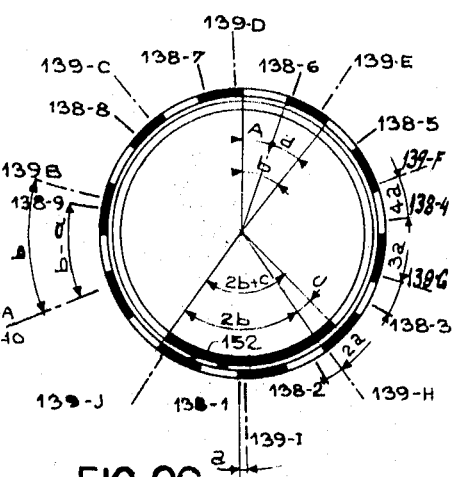

The arrangement of the photosensitive elements of the second stage, as well as the arrangement and circumferential dimension of the corresponding windows, are such that at any time, revolving in one direction or the other, the drum 342 permits the illumination (immediate or delayed) of the photosensitive elements in such a way that the occultations of these take place successively according to successive angles of rotation "$a$" (FIGS. 23 and 24) and this occultation lasts for the completion of one angle of rotation "$d$" (FIG. 26).

In the example in question the angle "$a$" corresponds to a linear movement of the controlled carriage of 0.01 mm. The detection capacity of this pickup is 100 points per revolution while that of the embodiment described earlier was only 50 points.

The angular opening "$A$" (FIG. 26) of each light can be chosen variously according to the inertia of the chain of stop control on the motors.

In the example in question the choice is:

$$A = 7-c$$

(see on FIG. 24 the full part masking the photosensitive element 138–7), "c" being the angular aperture of the photosensitive element (see FIG. 25).

Each of the ten full parts separating among themselves the 10 windows 346–0, 346–1......346–9 (FIG. 21) then has a peripheral length of:

$$d=b-A=-(7a-c)=b+c-7a.$$

The 10 sighting axes of the photosensitive elements of the first stage 139–A, 139–B...139–J (FIGS. 22 and 25) divide into 10 angles equal to "b" their circumference of detection. The 10 sighting axes of the photosensitive elements of the second stage 138–1, 138–2...138–10 (FIGS. 21 and 23) divide their circumference of detection into nine angles equal to "b—a" and a tenth angle equal to $(2b-a)$. FIG. 26 shows the multiple angular displacement of angle "a" between the sighting axes of the successive photosensitive elements of the two stages of detection.

The two stages of detection shown respectively in the two FIGS. 21 and 22 each comprise 10 locating photosensitive elements for measuring the linear movements of the carriage. It would also be possible to envisage a different division of the unit of measure recorded at the stage shown in FIG. 21 and its clearly defined multiples at the stage in FIG. 22, by using an adequate number of photosensitive elements, this number not being necessarily the same in the two stages.

Figure 24:
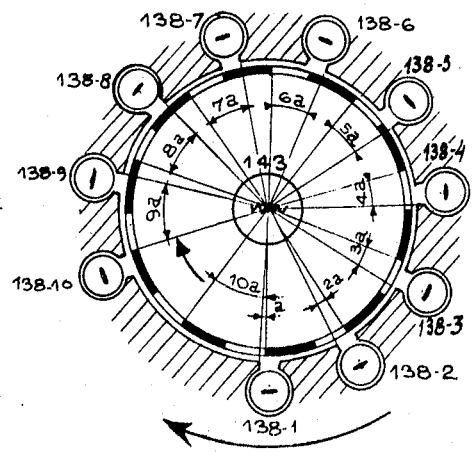

This detection system for the precision stopping shown in FIGS. 20 to 26 can be utilized in the same conditions as shown in FIGS. 5 to 11, that is, the first stage of detection shown in FIGS. 22 to 25 enables the preparation of the stopping of the carriage with a definition of 0.01 mm. for example, but, while the second stage in FIG. 6 permitted a stop with a definition of 0.02 mm., that in FIGS. 21,23 and 24 in the present embodiment makes it possible to ensure the stop with a definition of 0.01 mm., that is, a definition twice as precise.

In FIG. 28 there is depicted a sectional drawing of another embodiment of a detector created according to the same principle whose characteristic does not rest in the number and arrangement of the windows and photosensitive elements, but in the different and particularly simple manner in which are formed the part which has the windows and the part with the sockets in which are lodged the photosensitive elements.

In particular the revolving element which has the windows is no longer formed from a cylindrical drum but from a simple disc 442 (FIG. 30) which is part of the rotating shaft 424 (FIG. 28) which carries the graduated drum 165. This disc has a sector 452 whose radius is a little larger than the radius of the rest of the disc and which forms the mask with the same role as the mask 152 in the embodiment of FIG. 20, for example. A crown of holes 446–0, 446–1, 446–2...446–9 cut into this disc constitute the lights having the role of the lights as in 346–0 etc.....shown in FIG. 21.

The photosensitive elements 438–1, 438–2.....438–10 of the second stage of detection and the photosensitive elements 439–A, 39–B...439–J of the first stage of detection are arranged in longitudinal sockets 434–1, 434–2...434–0 (FIGS. 28 and 29) and in sockets 435–A, 435–B...435–J in the longitudinal direction in a fixed cylindrical part 432 in front of which the disc 442 turns.

The sockets 434–1 to 434–0 are distributed angularly in the same way as are set out the photosensitive elements 138–1 to 138–10 in FIG. 21. In similar manner the sockets 435–A to 435–J are equidistant like the photosensitive elements 139–A to 139–J in FIG. 22. Moreover the midpoints of the two radial edges at the ends of the sector 452 in FIG. 30 are located, naturally, on the same radius as that of the axes of the sockets 435–A to 435–J (FIG. 29). Likewise the windows 446–1 to 446–0 (FIG. 30) are arranged on a theoretical annulus with the same radius as that on which are located the sockets 434–1 to 434–0 (FIG. 29).

In FIGS. 29 and 30 the same notation for angular offsets has been used as in FIGS. 23 to 26 and the functioning of this disc device is exactly the same as that of the cylindrical drum device in FIGS. 20 to 26. It therefore offers the same capacity for detection of 100 points per revolution, but it has the advantage of providing a far more economical construction than the cylindrical drum detector.

The use of the detectors can be improved by adding a transcoding system which allows the operator, without using any special graph, to signal directly the dimension to be reached.

When the first detection device for the approach positions the table, by default, with an accuracy of say the order of 0.3 mm., the operator reads on vernier 165 (FIG. 20 for example) the dimension reached, say 0.18, for example, and notes that the table should run another 0.14 mm. forward before stopping at the exact point desired.

Knowing the direction of movement the operator decides, as a result, that it is necessary and sufficient to reach the dimension required, that the vernier 165 be positioned at the end of travel at the mark 32 or 4.

The transcoding system makes it possible to signal directly, by means of rotaters the number which will have to be indicated by the vernier index at the end of movement.

Each moving element of the machine and the set of elements responsible for its drive have their own inertia so that the definitive point of stopping of the moving element is always a little beyond the point where it is located at the exact moment of issuing the order to stop. This overrun is therefore variable with every moving element on the machine. To be able to take this into account it is possible to equip each detector D2 with a counter-mask, for example in the form of a circular disc 401 according to the embodiment in FIG. 28, whose structure is identical to that of disc 442 carrying the mask but which is set at a slight angle in relation to it and fixed in position by a lockscrew 402. This counter-mask, which can be seen behind the disc 442 in FIG. 30, makes it possible to reduce the effective circumferential length of the windows on the revolving unit.

By regulating the value of the relative angular setting of the counter-mask and the mask it is possible to regulate the anticipation of the stopping of the drive motor of the machine carriage so that, at the effective completion of travel, the index of the graduated drum 165 (FIG. 28) shows the number programmed by the operator.

In FIG. 27 there is depicted a schematic drawing of a type of electrical circuit controlling the windows for releasing the stop of a 100 point coder of the type of that shown in FIGS. 20 to 22 or FIGS. 28 to 30.

As has already been explained, the operator selects directly, on the matrix (of the kind described above) the number which is to be shown on the vernier 165 (FIGS. 20 and 28) when the controlled carriage comes to a stop. In the example shown in the drawing in FIG. 27, this number if "52."

According to the direction of rotation of the coder, it is possible to select the combination E and 2 or C and 5. This selection takes place automatically through a relay R7 put under tension for one of the directions of rotation.

The supplying of the amplifying relay R1 which controls the stopping of a movement and the changing of sequence, is still effected through the detector D1, as described earlier. The autosupply current of this relay passes through a contact R1D of this relay and a contact R6A of a supplementary relay R6. The release of this circuit R1 takes place therefore when relay R6 is stimulated.

Relay R6 itself is stimulated through a contact R4A of another relay R4 and a contact R5A of another relay R5 as well as by a circuit RC with a condenser and resistance.

Upon closing of relay R1 the contact R1E enables the supplying of the two amplifying relays R4 and R5. Relay R5 is brought in every time a light 346–0, 346–1.......346–9 (FIG. 21) of the second stage of detection permits the illumination of the photosensitive element 138–2 selected in the example in question. When contact R5A is closed the condenser-resistance circuit RC charges to discharge upon release of relay R5. Thus every time the controlled carriage advances by 0.1 mm. after the approach detection signal provided by detector D1, an electric impulse is sent towards contact R4A of relay R4 when it is closed as long as mask 152 (FIG. 22) of the first stage does not occult the photosensitive element 139-E (FIG. 27). This electrical impulse is then picked up by one of the terminals of a luminous sighting-slit V which flashes and thus indicates to the operator the intervention of detector D2. When the photosensitive element 139-E is no longer illuminated the relay R4 is released and directs the impulse provided by the circuit RC towards the coil of relay R6 which cuts off the autosupply R1 relay - and this causes the ending of the sequence and the stopping of the carriage when the graduated drum 165 shows the FIG. 52 desired.

Naturally the invention is not limited to the embodiments described and illustrated which have been given by way of examples; it is possible to make numerous modifications thereunto, according to the applications envisaged, without in so doing exceeding the bounds of the invention.

Thus for example it would be possible to use a disc as the rotating coding organ in the precise stop detector similar to that in FIGS. 5 to 13.

I claim:

1. An installation for positioning a movable element of a machine-tool along a predetermined path, said installation comprising drive means including a rotatable lead screw coupled to said element, drive speed control means, stop means to discontinue the drive and stop said element when said element reaches a desired position along the path, a course positioning control including means for detecting a first position of said element ahead of said desired position and for detecting a second position of said element between said first position and said desired position thereof, a fine positioning control including means coupled to said lead screw for producing within a full revolution thereof a control signal beginning when said element reaches a position intermediate said first and second positions and ending when said element reaches said desired position thereof, and actuating means for said drive speed control means and for said stop means, said actuating means being responsively coupled to said detecting means and being operable to cause said drive speed control means to reduce the drive speed when said detecting means detect said first position of the movable element and to condition said stop means to discontinue the drive when said detecting means detect said second position of the movable element, said control signal of said fine positioning control being coupled to said actuating means and being effective to override and prevent said actuating means from discontinuing the drive when said element reaches said second position and to allow said actuating means to stop the drive when said element reaches said desired position thereof.

2. An installation as claimed in claim 1, in which said fine positioning control includes a roll of fixed photosensitive elements selectively connected to an electrical circuit linked to a supply control device for said motor as a function of the exact position at which said carriage is to stop after slowing down in response to said course positioning control and, (b) at least one control window carried by a rotating mobile coding element between a light source and said roll of photosensitive elements and linked to said mechanism for controlling the drive to the carriage.

3. An installation as defined in claim 1, in which said course positioning control includes a perforated tape having several tracks based on the programs to be carried out, and a case of photosensitive elements, said tape and said photosensitive elements being carried, one by said carriage and the other by said carriage support.

4. An installation as defined in claim 1, in which said fine positioning control comprises a rotating coding element linked to said mechanism for controlling the drive and forming a moving aperture screen between a light source and photosensitive elements set at regular intervals in relation to said rotating coding element in a number corresponding to the precision required, and programmable means of preselection for the selective activating of said photosensitive elements, the whole unit being designed such that a complete revolution of said rotating coding element covers one length of travel of said carriage largely greater than the length of travel corresponding to the degree of precision of said course positioning control.

5. An installation as claimed in claim 4 in which said course positioning control includes means for counting the revolutions of said rotating coding element of said fine positioning control.

6. Installation as claimed in claim 5, in which said rotating coding element itself produces, with each revolution, an impulse for controlling the drive of a counter.

7. Installation as claimed in claim 4 additionally including adjustable manual means of preselection for the selective activating of said photosensitive elements of said fine positioning control means, and means of inversion for selectively placing said photosensitive elements either in a state of dependence on said programmed preselection means or in a state of dependence on said adjustable manual means for preselection.

8. Installation as claimed in claim 7, in which the adjustable manual means for preselection for the selective activating of the said photosensitive elements are made up of switches inserted into the supply circuits for said photosensitive elements.

9. An installation for programmed control of a machine-tool of the type comprising, for each carriage, a mechanism for controlling the drive link to a motor and a system for controlling the supply to said motor, said installation including means for the detection of approach having a relatively average accuracy of the order of 0.3 mm., by default, said approach detection means being capable of covering on their own the total these two pitches having a single interval of circumferential length substantially equal to that of the mask of the first stage of detection.

10. Installation as claimed in claim 9, in which each of the two stages comprises 10 photosensitive elements which are equidistant, the mask of the first stage extending over an arc covering two successive intervals between two photosensitive elements, the angle of the phase displacement of the lights of the second stage being equal to a fifth of the angle between two successive photosensitive elements, and the angle of the longest part between the windows of the second stage being equal to the angle of the mask of the first stage increased, at each of its two ends, by the angle of the displacement of phase, the photosensitive elements in odd order or those in even order in the second stage being selectively put into service condition according to whether the mask of the first stage is working itself in conjunction with a photosensitive element of odd or equal order.

11. An installation as claimed in claim 10, in which one revolution of the rotating coding element corresponds to a move forward of 1 mm. of the controlled member, the angle between two successive photosensitive elements being equal to one-tenth of the circumference corresponding to a travel of 0.1 mm. of the controlled member and the angle of displacement of phase being equal to one-fiftieths of the circumference corresponding to 0.02 mm. advance of the controlled member.

12. An installation as claimed in claim 7, in which the means for counting the revolution of the rotating coding element include a counting unit set at each sequence for a predetermined number of revolutions programmed by adding a signal to the matrix, the backwards count of this counting unit taking place in response to the impulses at each revolution of the rotating coding element, and wherein the adjustable manual means of preselection include a set of switches for setting the counting unit to any number of revolutions desired.

13. An installation as claimed in claim 2, in which the first stage of detection includes a number of equidistant photosensitive elements one-fiftieth a mask extending over an arc covering at least one successive interval between said photosensitive elements, and wherein the windows of the second stage of detection are equidistant and the photosensitive elements of the second stage detection are arranged according to a spacing smaller than that of said windows to the value of an angle of displacement of phase equal to one-fiftieth of the circumference corresponding to 0.02 mm. advance of the control member and distributed over an arc less than 360°.

14. Installation as claimed in claim 13, in which the arc covered by said mask corresponds to several said intervals.

15. Installation as claimed in claim 13 including more than two stages of detection, the additional stages being supplemental and having a finer or larger definition than the second stage of detection mentioned.

16. Installation as claimed in claim 13 in which the number of photosensitive elements in the second stage of detection is equal to the number of corresponding windows in the rotating coding element.

17. Installation as claimed in claim 2, in which the width of the windows of the rotating coding element is determined as a function of the inertia of the movement control of the member driven by the machine.

18. Installation as claimed in claim 2, in which the rotating coding element is in the form of a disc and its windows are formed from holes made in this disc on a same circumference.

19. Installation as claimed in claim 9, in which, against the mask, counter-mask is applied having the same profile as the mask and which has, in addition, a row of windows identical to those of the second stage of the rotating coding element of detection, said counter-mask being fixed to the mask in an angularly adjustable manner to permit the reduction of the effective width of the above-mentioned windows as a function of the inertia of the movement control of the corresponding carriage.

20. An installation for programmed control of a machine-tool of the type comprising, for each carriage, a mechanism for controlling the drive link to a motor and a system for controlling the supply to said motor, said installation including means for the detection of approach having a relatively average accuracy of the order of 0.3 mm., by default, said approach detection means being capable of covering on their own the total extend of travel of the carriage; and means for the detection of stopping having a relatively high accuracy of the order of 0.02 mm; and wherein said system for controlling the supply to said motor is connected through appropriate connecting means to selectively be commanded by said approach detection means, the information extent of travel of the carriage; and means for the detection of stopping having a relatively high accuracy of the order of 0.02 mm.; and wherein said system for controlling the supply to said motor is connected through appropriate connecting means to selectively be commanded by said approach detection means, the information supplied by said approach detection means causing the supply of current to said motor to change so as to slow down said motor to a constant minimum speed and at the same time conditioning said connecting means so that said supply control system is put under the control of said stop detection means, the information supplied by said stop detection means subsequently causing cutting off of said supply to the motor in order to ensure the precise stopping of said carriage, and in which the rotating coding element has at least two stages of detection, a first stage which includes, to the right of a first annular roll of photosensitive elements, a mask extending along a circumferential length greater than that corresponding to the angle of rotation of said rotating coding element which is driven by inertia after the control signal for precise stopping, and a second stage including, to the right of a second annular roll of photosensitive elements, several windows whose pitch is of an angle, in relation to the pitch of said corresponding photosensitive elements, of phase displacement equal to the smallest unit which it is desired to control, i.e., an angle corresponding to the definition which it is desired to obtain in stopping the control member, by substantially forming a vernier with one of supplied by said approach detection means causing the supply of current to said motor to change so as to slow down said motor to a constant minimum speed and at the same time conditioning said connecting means so that said supply control system is put under the control of said stop detection means, the information supplied by said stop detection means subsequently causing cutting off of said supply to the motor in order to ensure the precise stopping of said carriage, and wherein said programmable preselection means for the selective activating of said photosensitive elements includes a matrix the columns of which are supplied successively by a step-by-step selector switch placed in a state of dependence on said approach detection means, the lines of this matrix being placed, respectively, into circuit for supplying said photosensitive elements, preselection being determined by the positioning of pins pushed into the involved points of intersection of the columns and the lines of the matrix.